US009839062B2

(12) United States Patent
Guo et al.

(10) Patent No.: US 9,839,062 B2
(45) Date of Patent: *Dec. 5, 2017

(54) SHORT RANGE COMMUNICATIONS METHOD, DEVICE, AND SYSTEM

(71) Applicant: Huawei Technologies Co., Ltd., Shenzhen, Guangdong (CN)

(72) Inventors: Xiaolong Guo, Beijing (CN); Yue Li, Shenzhen (CN); Fei Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/408,115

(22) Filed: Jan. 17, 2017

(65) Prior Publication Data

US 2017/0196039 A1 Jul. 6, 2017

Related U.S. Application Data

(63) Continuation of application No. 14/719,563, filed on May 22, 2015, now Pat. No. 9,585,187, which is a continuation of application No. PCT/CN2012/085071, filed on Nov. 22, 2012.

(51) Int. Cl.
*H04B 7/00* (2006.01)
*H04W 76/02* (2009.01)
*H04W 4/00* (2009.01)

(52) U.S. Cl.
CPC ......... *H04W 76/025* (2013.01); *H04W 4/008* (2013.01); *H04W 76/021* (2013.01)

(58) Field of Classification Search
CPC .............. H04W 8/26; H04W 12/08; H04W 72/02–72/72; H04W 76/045
USPC ............................................... 455/41.2–41.3
See application file for complete search history.

(56) References Cited

U.S. PATENT DOCUMENTS

| 2009/0080391 | A1 | 3/2009 | Kwon et al. | |
|---|---|---|---|---|
| 2010/0009675 | A1* | 1/2010 | Wijting | H04W 72/02 455/426.1 |
| 2010/0265873 | A1 | 10/2010 | Yi et al. | |
| 2011/0268007 | A1* | 11/2011 | Barany | H04B 7/024 370/312 |
| 2012/0020213 | A1 | 1/2012 | Horneman et al. | |

(Continued)

FOREIGN PATENT DOCUMENTS

| CN | 1467971 A | 1/2004 |
|---|---|---|
| CN | 101180835 A | 5/2008 |

(Continued)

*Primary Examiner* — Simon Nguyen

(57) ABSTRACT

Embodiments of the present invention provide a short range communications method, device, and system, and relate to the field of communications, so that a UE can distinguish, on a short range link, a radio bearer corresponding to transmission of data information. The method includes: establishing, by a benefited UE, a mapping between a short range bearer and a first radio bearer, where a mapping is performed between the short range bearer and a second radio bearer on a supporting UE side, and a mapping is performed between the first radio bearer and the second radio bearer on a base station side; and performing, by the benefited UE, data receiving and sending by using the mapping between the first radio bearer and the short range bearer.

16 Claims, 7 Drawing Sheets

(56) References Cited

U.S. PATENT DOCUMENTS

| | | |
|---|---|---|
| 2012/0039262 A1 | 2/2012 | Walsh |
| 2012/0155410 A1 | 6/2012 | Toskala |
| 2012/0281685 A1 | 11/2012 | Kotecha |
| 2012/0287894 A1 | 11/2012 | Zhou et al. |
| 2013/0148637 A1 | 6/2013 | Yang |
| 2013/0171965 A1 | 7/2013 | Schrecker |
| 2013/0195033 A1 | 8/2013 | Koskinen |
| 2013/0201956 A1 | 8/2013 | Cho et al. |
| 2013/0244661 A1* | 9/2013 | Lin ............... H04W 76/023 455/436 |
| 2013/0286882 A1 | 10/2013 | Lim et al. |
| 2013/0287012 A1* | 10/2013 | Pragada ........... H04W 76/045 370/338 |
| 2013/0288668 A1* | 10/2013 | Pragada ............. H04W 12/06 455/426.1 |
| 2014/0079007 A1 | 3/2014 | Li et al. |
| 2015/0163837 A1 | 6/2015 | Li et al. |
| 2015/0237573 A1 | 8/2015 | Li et al. |
| 2015/0351141 A1* | 12/2015 | Naoe ................... H04W 8/26 370/329 |

FOREIGN PATENT DOCUMENTS

| | | |
|---|---|---|
| CN | 101232433 A | 7/2008 |
| CN | 101365159 A | 2/2009 |
| CN | 101409951 A | 4/2009 |
| CN | 102026398 A | 4/2011 |
| CN | 102215530 A | 10/2011 |
| CN | 102439871 A | 5/2012 |
| CN | 102469410 A | 5/2012 |
| CN | 103907393 A | 7/2014 |
| KR | 20120035871 A | 4/2012 |
| WO | 2010/150050 A1 | 12/2010 |
| WO | 2012093783 A2 | 7/2012 |

\* cited by examiner

SHORT RANGE COMMUNICATIONS METHOD, DEVICE, AND SYSTEM

CROSS-REFERENCE TO RELATED APPLICATIONS

This application is a continuation of U.S. patent application Ser. No. 14/719,563, filed on May 22, 2015, The International Application claims priority to International Application No. PCT/CN2012/085071, filed on Nov. 22, 2012. All of the afore-mentioned patent applications are hereby incorporated by reference in their entireties.

TECHNICAL FIELD

The present invention relates to the field of communications, and in particular, to a short range communications method, device, and system.

BACKGROUND

Short range communications generally refers to a technology of providing communication within a small area (several hundred meters). Currently, common technologies roughly include wireless short range communications such as an IEEE 802.11 WLAN (Wireless Local Area Networks, wireless local area network), an IEEE 802.15 WPAN (Wireless Personal Area Network, wireless personal area network), HomeRF (Home Radio Frequency, home radio frequency), and an infrared transmission technology, and wired communications technologies such as Ethernet Ethernet. The wired communications technologies may have a very long communications range, and are not necessarily short range communications. In this method, the wired communications technologies are generally referred to as short range communications, which is not described again.

In a scenario of cooperative communication in a single network node and between multiple users, or referred to as an MUCC (Multiple UEs Cooperative Communication, multiple UEs cooperative communication) scenario, when short range communication is performed between at least two UEs, an MUCC relationship may be established between these UEs to increase reliability and a throughput, for example, one UE of the at least two UEs needs to send or receive data, and another UE except the UE may assist the UE in communication. Herein, the UE is named as a benefited UE, and the another UE except the UE is named as a supporting UE; therefore, the supporting UE is a UE used to carry and transmit data, and the benefited UE is a sender or a final receiver and user of data.

For downlink data, a network may separately send downlink data to the supporting UE, and the supporting UE sends the data to the benefited UE by means of short range communications (such as WiFi), to complete cooperative communication between the UEs; the benefited UE finally merges the data. Similarly, uplink data may also be sent to the network by the benefited UE or another supporting UE, and then the network merges the data, to complete cooperative communication between the UEs.

However, in most short range communications technologies, connections between nodes are provided, QoS (Quality of Service, quality of service) is basically not distinguished, and further, there is no concept of a bearer. In a cellular network, a radio bearer is set up to distinguish different QoS. When multiple UEs cooperative communication is performed, for uplink and downlink data, a supporting UE or a benefited UE cannot distinguish, on a short range link, a radio bearer corresponding to the data; therefore, further data processing cannot be performed, and different QoS cannot be distinguished.

SUMMARY

Embodiments of the present invention provide a short range communications method, device, and system, so that a UE can distinguish, on a short range link, a radio bearer corresponding to transmission of data information.

According to a first aspect, a short range communications method is provided and includes:

establishing, by a benefited UE, a mapping between a short range bearer and a first radio bearer, where the first radio bearer is a benefited radio bearer of the benefited UE; the short range bearer is a bearer set up to assist a supporting UE in communication with the benefited UE; a mapping is performed between the short range bearer and a second radio bearer on a supporting UE side; and the second radio bearer is a radio bearer set up for the supporting UE to assist the first radio bearer, and a mapping is performed between the first radio bearer and the second radio bearer on a base station side; and performing, by the benefited UE, data receiving and sending by using the mapping between the first radio bearer and the short range bearer.

In a first possible implementation manner of the first aspect, before the establishing, by a benefited UE, a mapping between a short range bearer and a first radio bearer, the method further includes:

receiving, by the benefited UE, a first reconfiguration message sent by a base station, and setting up the first radio bearer according to the first reconfiguration message; and the establishing, by a benefited UE, a mapping between a short range bearer and a first radio bearer includes: establishing, by the benefited UE, the mapping between the short range bearer and the first radio bearer according to the first reconfiguration message.

In a second possible implementation manner of the first aspect, before the establishing, by a benefited UE, a mapping between a short range bearer and a first radio bearer, the method further includes:

receiving, by the benefited UE, a bearer setup message sent by a base station, and setting up the first radio bearer according to the bearer setup message;

the method further includes: receiving, by the benefited UE, a first reconfiguration message sent by the base station; and the establishing, by a benefited UE, a mapping between a short range bearer and a first radio bearer includes: establishing, by the benefited UE, the mapping between the short range bearer and the first radio bearer according to the first reconfiguration message.

With reference to the first aspect to the second possible implementation manner of the first aspect, in a third possible implementation manner, the method further includes:

acquiring, by the benefited UE, a first short range bearer identifier and a first radio bearer identifier that are configured by the base station, where the first short range bearer identifier corresponds to the short range bearer on a benefited UE side, and the first radio bearer identifier corresponds to the first radio bearer; and the establishing, by a benefited UE, a mapping between a short range bearer and a first radio bearer includes: establishing, by the benefited UE, the mapping between the short range bearer and the first radio bearer by using a mapping between the first short range bearer identifier and the first radio bearer identifier.

With reference to the third possible implementation manner, in a fourth possible implementation manner, the method further includes:

sending, by the benefited UE, the first short range bearer identifier to the supporting UE, so that when sending data to the benefited UE, the supporting UE adds the first short range bearer identifier to the data.

With reference to the third possible implementation manner or the fourth possible implementation manner, in a fifth possible implementation manner, the first short range bearer identifier is included in an Ether type field of a Media Access Control layer MAC layer or a Logical Link Control LLC layer of the benefited UE; or the first short range bearer identifier is included in a protocol layer indicated by an Ether type field of a MAC layer or an LLC layer of the benefited UE; or the first short range bearer identifier is included in a protocol layer that is indicated by a field of a network layer or a transport layer indicated by an Ether type field of a MAC layer or an LLC layer of the benefited UE.

According to a second aspect, a short range communications method is provided and includes:

establishing, by a supporting UE, a mapping between a short range bearer and a second radio bearer, where the second radio bearer is a radio bearer set up for the supporting UE to assist a first radio bearer; the short range bearer is a bearer set up to assist the supporting UE in communication with a benefited UE; a mapping is performed between the short range bearer and the first radio bearer on a benefited UE side; the first radio bearer is a benefited radio bearer of the benefited UE; and a mapping is performed between the first radio bearer and the second radio bearer on a base station side; and performing, by the supporting UE, data receiving and sending by using the mapping between the second radio bearer and the short range bearer.

In a first possible implementation manner of the second aspect, before the establishing, by a supporting UE, a mapping between a short range bearer and a second radio bearer, the method further includes:

receiving, by the supporting UE, a second reconfiguration message sent by a base station, and setting up the second radio bearer according to the second reconfiguration message; and the establishing, by a supporting UE, a mapping between a short range bearer and a second radio bearer includes:

establishing, by the supporting UE, the mapping between the short range bearer and the second radio bearer according to the second reconfiguration message.

In a second possible implementation manner of the second aspect, before the establishing, by a supporting UE, a mapping between a short range bearer and a second radio bearer, the method further includes:

receiving, by the supporting UE, a bearer setup message sent by a base station, and setting up the second radio bearer according to the bearer setup message;

the method further includes: receiving, by the supporting UE, a second reconfiguration message sent by the base station; and the establishing, by a supporting UE, a mapping between a short range bearer and a second radio bearer includes:

establishing, by the supporting UE, the mapping between the short range bearer and the second radio bearer according to the second reconfiguration message.

With reference to the second aspect to the second possible implementation manner of the second aspect, in a third possible implementation manner, the method further includes: acquiring, by the supporting UE, a second short range bearer identifier and a second radio bearer identifier that are configured by the base station, where the second short range bearer identifier corresponds to the short range bearer on a supporting UE side, and the second radio bearer identifier corresponds to the second radio bearer; and the establishing, by a supporting UE, a mapping between a short range bearer and a second radio bearer includes: establishing, by the supporting UE, the mapping between the short range bearer and the second radio bearer by using a mapping between the second short range bearer identifier and the second radio bearer identifier.

With reference to the third possible implementation manner, in a fourth possible implementation manner, the method further includes: sending, by the supporting UE, the second short range bearer identifier to the benefited UE, so that when sending data to the supporting UE, the benefited UE adds the second short range bearer identifier to the data.

With reference to the third possible implementation manner or the fourth possible implementation manner, in a fifth possible implementation manner, the second short range bearer identifier is included in an Ether type field of a Media Access Control layer MAC layer or a Logical Link Control LLC layer of the supporting UE; or the second short range bearer identifier is included in a protocol layer indicated by an Ether type field of a MAC layer or an LLC layer of the supporting UE; or the second short range bearer identifier is included in a protocol layer that is indicated by a field of a network layer or a transport layer indicated by an Ether type field of a MAC layer or an LLC layer of the supporting UE.

According to a third aspect, a short range communications method is provided and includes:

sending, by a base station, a second reconfiguration message to a supporting UE, so that the supporting UE establishes a mapping between a short range bearer and a second radio bearer according to the second reconfiguration message, and performs data receiving and sending by using the mapping between the second radio bearer and the short range bearer, where the second radio bearer is a radio bearer set up for the supporting UE to assist a first radio bearer; the short range bearer is a bearer set up for to assist the supporting UE in communication with a benefited UE; the first radio bearer is a benefited radio bearer of the benefited UE, and a mapping is performed between the first radio bearer and the short range bearer on a benefited UE side; and a mapping is performed between the first radio bearer and the second radio bearer on a base station side; and performing, by the base station, data sending or receiving by using the mapping between the first radio bearer and the second radio bearer.

In a first possible implementation manner of the third aspect, the method further includes:

sending, by the base station, a first reconfiguration message to the benefited UE, so that the benefited UE establishes the mapping between the short range bearer and the first radio bearer according to the first reconfiguration message, and performs data receiving and sending by using the mapping between the first radio bearer and the short range bearer.

With reference to the first possible implementation manner of the third aspect, in a second possible implementation manner, the sending, by the base station, a first reconfiguration message to the benefited UE includes: sending, by the base station, first short range bearer configuration information to the benefited UE, so that the benefited UE sets up the short range bearer according to the first short range bearer configuration information; or the sending, by a base station, a second reconfiguration message to a supporting UE includes: sending, by the base station, second short range bearer configuration information to the supporting UE, so that the supporting UE sets up the short range bearer according to the second short range bearer configuration information.

With reference to the second possible implementation manner, in a third possible implementation manner, the method further includes: configuring, by the base station, a first short range bearer identifier and a first radio bearer identifier, and sending them to the benefited UE, where the first short range bearer identifier corresponds to the short range bearer, and the first radio bearer identifier corresponds to the first radio bearer, so that the benefited UE establishes the mapping between the short range bearer and the first radio bearer according to the first short range bearer identifier and the first radio bearer identifier; and configuring, by the base station, a second short range bearer identifier and a second radio bearer identifier, and sending them to the supporting UE, where the second short range bearer identifier corresponds to the short range bearer, and the second radio bearer identifier corresponds to the second radio bearer, so that the supporting UE establishes the mapping between the short range bearer and the second radio bearer according to the second short range bearer identifier and the second radio bearer identifier.

With reference to the third possible implementation manner, in a fourth possible implementation manner, the first short range bearer identifier is included in an Ether type field of a MAC layer or an LLC layer of the benefited UE; or the first short range bearer identifier is included in a protocol layer indicated by an Ether type field of a MAC layer or an LLC layer of the benefited UE; or the first short range bearer identifier is included in a protocol layer that is indicated by a field of a network layer or a transport layer indicated by an Ether type field of a MAC layer or an LLC layer of the benefited UE; and the second short range bearer identifier is included in an Ether type field of a MAC layer or an LLC layer of the supporting UE; or the second short range bearer identifier is included in a protocol layer indicated by an Ether type field of a MAC layer or an LLC layer of the supporting UE; or the second short range bearer identifier is included in a protocol layer that is indicated by a field of a network layer or a transport layer indicated by an Ether type field of a MAC layer or an LLC layer of the supporting UE.

According to a fourth aspect, a short range communications method is provided and includes:

sending, by a base station, a first reconfiguration message to a benefited UE, so that the benefited UE establishes a mapping between a short range bearer and a first radio bearer according to the first reconfiguration message, and performs data receiving and sending by using the mapping between the first radio bearer and the short range bearer, where the first radio bearer is a benefited radio bearer of the benefited UE; the short range bearer is a bearer set up to assist a supporting UE in communication with the benefited UE; a mapping is performed between the short range bearer and a second radio bearer on a supporting UE side; the second radio bearer is a radio bearer set up for the supporting UE to assist the first radio bearer; and a mapping is performed between the first radio bearer and the second radio bearer on a base station side; and performing, by the base station, data sending or receiving by using the mapping between the first radio bearer and the second radio bearer.

According to a fifth aspect, a short range communications method is provided and includes: receiving data information sent by a base station, where the data information carries a radio bearer identifier configured in the base station, where the radio bearer identifier corresponds to a radio bearer set up by a UE; and determining, according to the radio bearer identifier, a radio bearer corresponding to the data information sent by the base station.

In a first possible implementation manner of the fifth aspect, the radio bearer identifier is included in a Packet Data Convergence Protocol PDCP layer of the base station, or a protocol layer above the PDCP layer, or a protocol layer between the PDCP layer and a Radio Link Control RLC layer, or the RLC layer, or a protocol layer between the RLC layer and a MAC layer, or the MAC layer, or a protocol layer between the MAC layer and a PHY layer, or the PHY layer.

According to a sixth aspect, a UE is provided and includes:

a processing unit, configured to establish a mapping between a short range bearer and a first radio bearer, where the first radio bearer is a benefited radio bearer of a benefited UE; the short range bearer is a bearer set up to assist a supporting UE in communication with the benefited UE; a mapping is performed between the short range bearer and a second radio bearer on a supporting UE side; and the second radio bearer is a radio bearer set up for the supporting UE to assist the first radio bearer, and a mapping is performed between the first radio bearer and the second radio bearer on a base station side; and a transceiver unit, configured to perform data receiving and sending by using the mapping established by the processing unit between the first radio bearer and the short range bearer.

In a first possible implementation manner of the sixth aspect, the transceiver unit is further configured to: before the processing unit establishes the mapping between the short range bearer and the first radio bearer, receive a first reconfiguration message sent by a base station; and the processing unit is further configured to set up the first radio bearer according to the first reconfiguration message, and establish the mapping between the short range bearer and the first radio bearer according to the first reconfiguration message received by the transceiver unit.

In a second possible implementation manner of the sixth aspect, the transceiver unit is further configured to: before the processing unit establishes the mapping between the short range bearer and the first radio bearer, receive a bearer setup message sent by a base station;

the processing unit is further configured to set up the first radio bearer according to the bearer setup message;

the transceiver unit is further configured to receive a first reconfiguration message sent by the base station; and the processing unit is specifically configured to establish the mapping between the short range bearer and the first radio bearer according to the first reconfiguration message received by the transceiver unit.

With reference to the sixth aspect to the second possible implementation manner, in a third possible implementation manner, the transceiver unit is further configured to acquire a first short range bearer identifier and a first radio bearer identifier that are configured by the base station, where the first short range bearer identifier corresponds to the short range bearer, and the first radio bearer identifier corresponds to the first radio bearer; and the processing unit is specifically configured to establish the mapping between the short range bearer and the first radio bearer by using a mapping between the first short range bearer identifier and the first radio bearer identifier.

With reference to the third possible implementation manner, in a fourth possible implementation manner, the transceiver unit is further configured to send the first short range bearer identifier to the supporting UE, so that when sending data to the benefited UE, the supporting UE adds the first short range bearer identifier to the data.

With reference to the third possible implementation manner or the fourth possible implementation manner, in a fifth possible implementation manner, the first short range bearer identifier is included in an Ether type field of a Media Access Control layer MAC layer or a Logical Link Control LLC layer of the benefited UE; or the first short range bearer identifier is included in a protocol layer indicated by an Ether type field of a MAC layer or an LLC layer of the benefited UE; or the first short range bearer identifier is included in a protocol layer that is indicated by a field of a network layer or a transport layer indicated by an Ether type field of a MAC layer or an LLC layer of the benefited UE.

According to a seventh aspect, a UE is provided and includes:

a processing unit, configured to establish a mapping between a short range bearer and a second radio bearer, where the second radio bearer is a radio bearer set up for a supporting UE to assist a first radio bearer; the short range bearer is a bearer set up to assist the supporting UE in communication with a benefited UE; the first radio bearer is a benefited radio bearer of the benefited UE; and a mapping is performed between the first radio bearer and the second radio bearer on a base station side; and a transceiver unit, configured to perform data receiving and sending by using the mapping established by the processing unit between the second radio bearer and the short range bearer.

In a first possible implementation manner of the seventh aspect, the transceiver unit is configured to receive a second reconfiguration message sent by a base station;

the processing unit is further configured to set up the second radio bearer according to the second reconfiguration message received by the transceiver unit; and the processing unit is specifically configured to establish the mapping between the short range bearer and the second radio bearer according to the second reconfiguration message received by the transceiver unit.

In a second possible implementation manner of the seventh aspect, the transceiver unit is further configured to receive a bearer setup message sent by a base station;

the processing unit is further configured to set up the second radio bearer according to the bearer setup message received by the transceiver unit;

the transceiver unit is further configured to receive a second reconfiguration message sent by the base station; and the processing unit is specifically configured to establish the mapping between the short range bearer and the second radio bearer according to the second reconfiguration message received by the transceiver unit.

With reference to the seventh aspect to the second possible implementation manner, in a third possible implementation manner, the transceiver unit is further configured to acquire a second short range bearer identifier and a second radio bearer identifier that are configured by the base station, where the second short range bearer identifier corresponds to the short range bearer, and the second radio bearer identifier corresponds to the second radio bearer; and the processing unit is specifically configured to establish the mapping between the short range bearer and the second radio bearer by using a mapping between the second short range bearer identifier and the second radio bearer identifier.

With reference to the third possible implementation manner, in a fourth possible implementation manner, the transceiver unit is further configured to send the second short range bearer identifier to the benefited UE, so that when sending data to the supporting UE, the benefited UE adds the second short range bearer identifier to the data.

With reference to the third possible implementation manner or the fourth possible implementation manner, in a fifth possible implementation manner, the second short range bearer identifier is included in an Ether type field of a Media Access Control layer MAC layer or a Logical Link Control LLC layer of the supporting UE; or the second short range bearer identifier is included in a protocol layer indicated by an Ether type field of a MAC layer or an LLC layer of the supporting UE; or the second short range bearer identifier is included in a protocol layer that is indicated by a field of a network layer or a transport layer indicated by an Ether type field of a MAC layer or an LLC layer of the supporting UE.

According to an eighth aspect, a base station is provided and includes:

a transceiver unit, configured to send a second reconfiguration message to a supporting UE, so that the supporting UE establishes a mapping between a short range bearer and a second radio bearer according to the second reconfiguration message, and performs data receiving and sending by using the mapping between the second radio bearer and the short range bearer, where the second radio bearer is a radio bearer set up for the supporting UE to assist a first radio bearer; the short range bearer is a bearer set up to assist the supporting UE in communication with a benefited UE; the first radio bearer is a benefited radio bearer of the benefited UE, and a mapping is performed between the first radio bearer and the short range bearer on a benefited UE side; and a mapping is performed between the first radio bearer and the second radio bearer on a base station side; and the transceiver unit is further configured to perform data sending or receiving by using the mapping between the first radio bearer and the second radio bearer.

In a first possible implementation manner of the eighth aspect, the transceiver unit is further configured to send a first reconfiguration message to the benefited UE, so that the benefited UE establishes the mapping between the short range bearer and the first radio bearer according to the first reconfiguration message, and performs data receiving and sending by using the mapping between the first radio bearer and the short range bearer.

With reference to the first possible implementation manner, in a second possible implementation manner, the transceiver unit is specifically configured to send first short range bearer configuration information to the benefited UE, so that the benefited UE sets up the short range bearer according to the first short range bearer configuration information; and the transceiver unit is specifically configured to send second short range bearer configuration information to the supporting UE, so that the benefited UE sets up the short range bearer according to the second short range bearer configuration information.

With reference to the second possible implementation manner, in a third possible implementation manner, the base station further includes:

a processing unit, configured to configure a first short range bearer identifier and a first radio bearer identifier, where the first short range bearer identifier corresponds to the short range bearer, and the first radio bearer identifier corresponds to the first radio bearer; and the transceiver unit is further configured to send the first short range bearer identifier and the first radio bearer identifier that are configured by the processing unit to the benefited UE, so that the benefited UE establishes the mapping between the short range bearer and the first radio bearer according to the first short range bearer identifier and the first radio bearer identifier; and the processing unit is further configured to configure a second short range bearer identifier and a second radio bearer identifier, where the second short range bearer identifier corresponds to the short range bearer, and the second radio bearer identifier corresponds to the second radio bearer; and the transceiver unit is further configured to send the second short range bearer identifier and the second radio bearer identifier that are configured by the processing unit to the supporting UE, so that the supporting UE establishes the mapping between the short range bearer and the second radio bearer according to the second short range bearer identifier and the second radio bearer identifier.

With reference to the third possible implementation manner, in a fourth possible implementation manner, the first short range bearer identifier is included in an Ether type field of a MAC layer or an LLC layer of the benefited UE; or the first short range bearer identifier is included in a protocol layer indicated by an Ether type field of a MAC layer or an LLC layer of the benefited UE; or the first short range bearer identifier is included in a protocol layer that is indicated by a field of a network layer or a transport layer indicated by an Ether type field of a MAC layer or an LLC layer of the benefited UE; and the second short range bearer identifier is included in an Ether type field of a MAC layer or an LLC layer of the supporting UE; or the second short range bearer identifier is included in a protocol layer indicated by an Ether type field of a MAC layer or an LLC layer of the supporting UE; or the second short range bearer identifier is included in a protocol layer that is indicated by a field of a network layer or a transport layer indicated by an Ether type field of a MAC layer or an LLC layer of the supporting UE.

According to a ninth aspect, a base station is provided and includes: a transceiver unit, configured to send a first reconfiguration message to a benefited UE, so that the benefited UE establishes a mapping between a short range bearer and a first radio bearer according to the first reconfiguration message, and performs data receiving and sending by using the mapping between the first radio bearer and the short range bearer, where the first radio bearer is a benefited radio bearer of the benefited UE; the short range bearer is a bearer set up to assist a supporting UE in communication with the benefited UE; a mapping is performed between the short range bearer and a second radio bearer on a supporting UE side; the second radio bearer is a radio bearer set up for the supporting UE to assist the first radio bearer; and a mapping is performed between the first radio bearer and the second radio bearer on a base station side; and the transceiver unit is further configured to perform data sending or receiving by using the mapping between the first radio bearer and the second radio bearer.

According to a tenth aspect, a UE is provided and includes: a receiving unit, configured to receive data information sent by a base station, where the data information carries a radio bearer identifier configured in the base station, where the radio bearer identifier corresponds to a radio bearer set up by the UE; and a processing unit, configured to determine, according to the radio bearer identifier received by the receiving unit, a radio bearer corresponding to the data information sent by the base station.

In a first possible implementation manner of the tenth aspect, the radio bearer identifier is included in a Packet Data Convergence Protocol PDCP layer of the base station, or a protocol layer above the PDCP layer, or a protocol layer between the PDCP layer and a Radio Link Control RLC layer, or the RLC layer, or a protocol layer between the RLC layer and a MAC layer, or the MAC layer, or a protocol layer between the MAC layer and a PHY layer, or the PHY layer.

According to a twelfth aspect, a base station is provided and includes:

a sending unit, configured to send data information to a UE, so that the UE determines, according to a radio bearer identifier, a radio bearer corresponding to the data information sent by the base station, where the data information carries the radio bearer identifier configured in the base station, and the radio bearer identifier corresponds to the radio bearer set up by the UE.

In a first possible implementation manner of the twelfth aspect, the radio bearer identifier is included in a Packet Data Convergence Protocol PDCP layer of the base station, or a protocol layer above the PDCP layer, or a protocol layer between the PDCP layer and a Radio Link Control RLC layer, or the RLC layer, or a protocol layer between the RLC layer and a MAC layer, or the MAC layer, or a protocol layer between the MAC layer and a PHY layer, or the PHY layer.

According to a thirteenth aspect, a short range communications system is provided and includes: the UE described in the sixth aspect, the UE described in the seventh aspect, and the base station described in the eighth aspect.

According to a fourteenth aspect, a short range communications system is provided and includes: the UE described in the eleventh aspect and the base station described in the twelfth aspect.

By using the foregoing solutions, a mapping exists between a first radio bearer and a short range bearer, a mapping exists between a second radio bearer and the short range bearer, and meanwhile, a mapping exists between the first radio bearer and the second radio bearer; in this case, one-to-one mappings are formed between bearers. In downlink data transmission, a supporting UE sends data to a benefited UE by using the short range bearer according to the mapping between the second radio bearer and the short range bearer, and when the data is received, the benefited UE sends, by using the mapping between the short range bearer and the first radio bearer, the data to a protocol layer corresponding to the first radio bearer of the benefited UE for processing. In uplink data transmission, the benefited UE sends data to the supporting UE by using the short range bearer according to the mapping between the first radio bearer and the short range bearer, and when the data is received, the supporting UE sends the data to a base station by using the second radio bearer and by using the mapping between the short range bearer and the second radio bearer; the base station sends, according to the mapping between the second radio bearer of the supporting UE and the first radio bearer of the benefited UE, the data to the protocol layer corresponding to the first radio bearer for processing. In this way, a UE can distinguish, on a short range link, a radio bearer corresponding to transmission of data information and perform corresponding processing.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
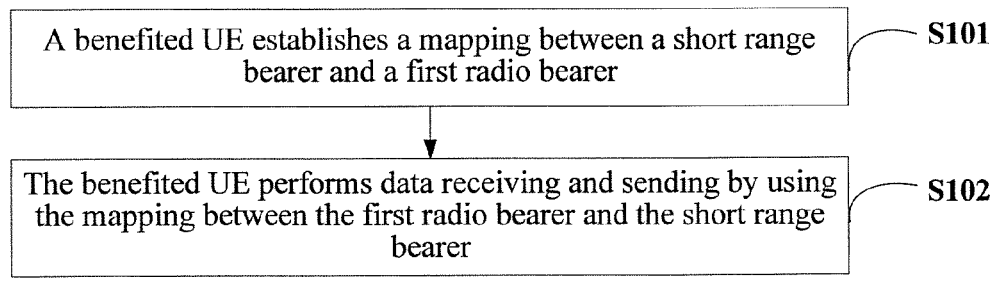
FIG. 1 is a schematic diagram of a short range communications method according to an embodiment of the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Generally, a smartphone can support both short range communications technologies (such as WiFi or BlueTooth or LTE-D2D) and cellular communications technologies (such as LTE, 3G UMTS or CDMA, 2G GSM, and WiMAX). Using the cellular technology SAE/LTE and the short range communications technology WiFi as an example, in a scenario of cooperative communication in a single network node and between multiple users, or referred to as a multiple UEs cooperative communication (multiple UEs cooperative communication, MUCC for short) scenario, when at least two UEs (User Equipment, terminal) have features of supporting both WiFi and LTE, an MUCC relationship may be established between the at least two UEs to increase reliability and a throughput, that is, one UE of the at least two UEs needs to send or receive data, and another UE except the UE may assist the UE in communication. Specifically, a network may establish a pairing relationship between the UE and the another UE according to pairing information reported by the another UE; or a network itself may select the another UE near the UE, and establish a pairing relationship between the UE and the another near UE. In the present invention, the UE is named as an assisted UE, a served UE, or a benefited UE, and the another UE except the UE is named as an assisting UE, a serving UE, or a supporting UE. The foregoing naming of the UEs is merely an example in the present invention, and naming of the UEs in the present invention includes, but is not limited to, the foregoing naming example.

The supporting UE and the benefited UE are used as an example. The benefited UE is a final sender of uplink data or a final receiver of downlink data (for the perspective of cellular), and for one RB, there is generally only one benefited UE. The supporting UE is a UE used to assist the benefited UE in data relay, and for one RB of the benefited UE, there may be multiple supporting UEs.

By using the supporting UE and the benefited UE as an example, concepts of the benefited UE and the supporting UE are viewed from the perspective of an RB of the benefited UE. One benefited UE may have one supporting UE. For example, a UE1 and a UE2 form MUCC, and they may assist each other in communication. In this way, from the perspective of one RB of the UE1, the UE2 may support the RB of the UE1; therefore the UE1 is the benefited UE, and the UE2 is the supporting UE. At the same time, the UE1 may also support one RB of the UE2; therefore, from the perspective of the RB of the UE2, the UE2 is the benefited UE, and the UE1 is the supporting UE. One UE may also have multiple supporting UEs. For example, a UE3 may also support the RB of the UE2. In this way, the UE2 has two supporting UEs, namely, the UE1 and the UE3.

By using the supporting UE and the benefited UE as an example, when the foregoing UEs are in a same range of short range connections, a network may separately send downlink data to the supporting UE and the benefited UE (one optimization method is that data is always sent to a UE having a best radio link condition during network scheduling), and when the network sends the downlink data to the supporting UE, the supporting UE that receives the data sends the data to the benefited UE by means of short range communications (such as WiFi) or a wired network (if there is a wired connection between the benefited UE and the supporting UE). Certainly, the data may also directly reach the benefited UE (if the benefited UE has a best radio link during certain scheduling), and the benefited UE merges the data. Similarly, uplink data of the benefited UE may also be sent to the network by the benefited UE itself or by another supporting UE, and then the network merges the data, to complete cooperative communication between the UEs.

For downlink data, a network may separately send downlink data to the supporting UE, and the supporting UE sends the data to the benefited UE by means of short range communications (such as WiFi), to complete cooperative communication between the UEs; the benefited UE finally merges the data. Similarly, uplink data may also be sent to the network by the benefited UE or another supporting UE, and then the network merges the data, to complete cooperative communication between the UEs.

Transmission assisted by the supporting UE can increase reliability and a throughput for communication of the benefited UE.

An embodiment of the present invention provides a short range communications method. As shown in FIG. 1, this embodiment of the present invention is executed by a benefited UE, and the method includes:

S101: A benefited UE establishes a mapping between a short range bearer and a first radio bearer.

The first radio bearer is a benefited radio bearer of the benefited UE; the short range bearer is a bearer set up to assist a supporting UE in communication with the benefited UE; a mapping is performed between the short range bearer and a second radio bearer on a supporting UE side; and the second radio bearer is a radio bearer set up for the supporting UE to assist the first radio bearer, and a mapping is performed between the first radio bearer and the second radio bearer on a base station side.

It should be noted that the mapping between the short range bearer and the second radio bearer on the supporting UE side may be established by the supporting UE. Specifically, the supporting UE receives a second reconfiguration message sent by a base station, and establishes the mapping between the short range bearer and the second radio bearer according to the second reconfiguration message.

S102: The benefited UE performs data receiving and sending by using the mapping between the first radio bearer and the short range bearer.

Optionally, before establishing the mapping between the short range bearer and the first radio bearer, the benefited UE may also set up the first radio bearer, where the first radio bearer is set up and the mapping between the short range bearer and the first radio bearer is established in the following two manners:

Manner 1: The benefited UE receives a first reconfiguration message sent by the base station, and sets up the first radio bearer according to the first reconfiguration message; the benefited UE establishes the mapping between the short range bearer and the first radio bearer according to the first reconfiguration message.

Manner 2: The benefited UE receives a bearer setup message sent by the base station, and sets up the first radio bearer according to the bearer setup message; the benefited UE receives a first reconfiguration message sent by the base station, and establishes the mapping between the short range bearer and the first radio bearer according to the first reconfiguration message.

A difference between manner 1 and manner 2 is that: in manner 1, the benefited UE completes setup of the first radio bearer and establishment of the mapping between the short range bearer and the first radio bearer according to the first reconfiguration message sent by the base station; whereas in manner 2, the benefited UE sets up the first radio bearer by using the bearer setup message received from the base station, and establishes the mapping between the short range bearer and the first radio bearer by using the first reconfiguration message received from the base station. That is, in manner 1, setup of the first bearer and establishment of the mapping between the short range bearer and the first radio bearer are completed by using only one message; whereas in manner 2, setup of the first bearer and establishment of the mapping between the short range bearer and the first radio bearer are separately completed by using two messages.

Optionally, the benefited UE sets up the short range bearer according to first short range bearer configuration information in the first reconfiguration message.

Specifically, the first short range bearer configuration information includes short range information (such as a frequency channel number) of the supporting UE.

It should be noted that the short range bearer may also be set up by the supporting UE according to second short range bearer configuration information in the second reconfiguration message after the supporting UE receives the second reconfiguration message sent by the base station. The second short range bearer configuration information includes short range information (such as a frequency channel number) of the benefited UE. Certainly, the benefited UE itself may also set up the short range bearer.

In addition, that the base station controls the benefited UE or the supporting UE to set up the short range bearer specifically includes the following two cases:

Case 1: When the benefited UE initiates a service, the first radio bearer has not been set up; in this case, the short range bearer is set up at the same time as the benefited UE sets up the first radio bearer according to the first reconfiguration message.

Case 2: When the benefited UE initiates a service, the first radio bearer has been set up; in this case, the first radio bearer needs to be reconfigured, according to the first reconfiguration message, for the service initiated by the benefited UE, and the short range bearer is set up when the first radio bearer is reconfigured.

Optionally, the benefited UE acquires a first short range bearer identifier and a first radio bearer identifier that are configured by the base station.

The first short range bearer identifier corresponds to the short range bearer on a benefited UE side, and the first radio bearer identifier corresponds to the first radio bearer.

The benefited UE establishes the mapping between the short range bearer and the first radio bearer by using a mapping between the first short range bearer identifier and the first radio bearer identifier.

Further, the benefited UE sends the first short range bearer identifier to the supporting UE, so that when sending data to the benefited UE, the supporting UE adds the first short range bearer identifier to the data.

Specifically, when the supporting UE sends data to the benefited UE, the data may carry the first short range bearer identifier, so that the benefited UE can identify, according to the first short range bearer identifier, the short range bearer corresponding to the data and then perform processing.

Optionally, the benefited UE establishes a mapping between the short range bearer and a first radio sub-bearer.

The first radio sub-bearer is a bearer in a one-to-one correspondence to the second radio bearer in the first radio bearer.

Further, before the benefited UE establishes the mapping between the short range bearer and the first radio sub-bearer, the benefited UE sets up the first radio sub-bearer, where the number of the first radio sub-bearers is the same as the number of the supporting UEs.

Optionally, the benefited UE sends a second connection request message to the base station, so that the base station configures the second radio bearer according to second benefited bearer information in the second connection request message.

The second benefited bearer information includes: an identifier of the supporting UE, the first radio bearer identifier, and the first short range bearer identifier and/or a second short range bearer identifier, where the second short range bearer identifier is an identifier corresponding to the short range bearer on the supporting UE side.

It should be noted that configuration of the second radio bearer may also be that: the supporting UE sends a first connection request message to the base station, so that the base station correspondingly configures the second radio bearer according to first benefited bearer information in the first connection request message.

The first benefited bearer information includes: an identifier of the benefited UE, the first radio bearer identifier (or a first radio sub-bearer identifier), and the first short range bearer identifier and/or the second short range bearer identifier.

Further, when a preset condition is satisfied, the benefited UE or the supporting UE sends a release request message to the base station, and after the base station receives the release request message, the supporting UE receives a release message sent by the base station; or the benefited UE sends a release request message to the base station, and after the base station receives the release request message, the supporting UE and the benefited UE receive a release message sent by the base station.

For example, when a distance between the supporting UE and the benefited UE exceeds a preset distance, the base station receives a release request message sent by the supporting UE or the benefited UE, and sends a release message to the supporting UE according to the release request message, so that the supporting UE releases the corresponding second radio bearer and the mapping relationship between the second radio bearer and the short range bearer. The preset distance may be set according to an actual application or an empirical value. The base station deletes the second radio bearer of the supporting UE and a mapping between the second radio bearer and a first short range bearer, and the base station deletes a mapping between the first radio bearer of the benefited UE and the first short range bearer.

Specifically, the supporting UE may delete the short range bearer according to the release message, and deletion of the short range bearer may also lead to deletion of the second radio bearer. Certainly, the base station may also send a reconfiguration message to the benefited UE, so that the benefited UE deletes the mapping relationship between the first radio bearer or sub-bearer and the first short range bearer. Specifically, the short range bearer between the benefited UE and the supporting UE may also be deleted. If all short range bearers between the benefited UE and the supporting UE are deleted, correspondingly, a short range connection between the benefited UE and the supporting UE is also deleted.

For another example, when the first radio bearer of the benefited UE is deleted because the benefited UE cancels a corresponding service, the base station receives a release request message sent by the benefited UE, and sends a release message to the supporting UE and the benefited UE according to the release request message. The base station deletes the second radio bearer of the supporting UE and the mapping between the second radio bearer and the first short range bearer, and the base station deletes the mapping between the first radio bearer of the benefited UE and the first short range bearer.

Specifically, the supporting UE or the benefited UE (the supporting UE or the benefited UE may be configured according to an actual application) may delete the short range bearer according to the release message, and deletion of the short range bearer may also lead to deletion of the second radio bearer and the first radio sub-bearer. In addition, if all short range bearers are deleted, correspondingly, a short range connection is deleted.

The following describes that the benefited UE and the supporting UE distinguish the short range bearer by using the first short range bearer identifier.

The short range bearer is distinguished by using the first short range bearer identifier mainly in the following three manners:

Manner 1: The first short range bearer identifier is included in an Ether type field of a MAC (Media Access Control, Media Access Control layer) layer or an LLC (Logical Link Control, Logical Link Control) layer of the benefited UE.

For example, by using an LTE (Long Term Evolution, Long Term Evolution) system as an example, the maximum number of the first short range bearer identifiers does not exceed 16, and generally is less than 8; therefore, the first short range bearer identifier (for example, 8 first short range bearer identifiers) may be directly defined in the Ether type field to correspond to different short range bearers.

This manner has an advantage of avoiding definition of a new protocol layer.

Manner 2: The first short range bearer identifier is included in a protocol layer indicated by an Ether type field of a MAC layer or an LLC layer of the benefited UE.

The protocol layer herein is a newly defined protocol layer, and the protocol layer is indicated by the Ether type field.

This manner has advantages of lower latency and high data processing efficiency, but has a disadvantage of greater impact on an existing protocol.

Manner 3: The first short range bearer identifier is included in a protocol layer indicated by a field of a network layer or transport layer of the benefited UE.

The protocol layer herein is also a newly defined protocol layer, the Ether type field indicates the field of the network layer or transport layer, and the field of the network layer or transport layer indicates the newly defined protocol layer.

Mainly in this manner, the protocol layer is defined above a higher layer of a protocol stack, which has an advantage of small impact on an existing protocol, but has disadvantages of higher latency, low data processing efficiency, and dependence on an operating system of the higher layer.

In addition, if the Ether type field is included in the MAC layer, the LLC layer may not be required.

It should be noted that establishment of each bearer identifier cannot be used repeatedly in a same UE, but can be used repeatedly in different UEs.

That is, when one UE corresponds to multiple bearers, each bearer corresponds to a different bearer identifier; however, for two different UEs, bearers of the two different UEs may correspond to a same bearer identifier.

For example, it is assumed that one supporting UE (marked as a UE1) corresponds to two benefited UEs (separately marked as a UE2 and a UE3), a short range connection may be established between the UE1 and the UE2, and a short range connection may be established between the UE1 and the UE3. If the UE2 includes two radio bearers (marked as a radio bearer 1 and a radio bearer 2), and the UE3 includes one radio bearer (marked as a radio bearer 3), the UE1 sets up a radio bearer 4 of the UE1 in correspondence to an identifier of the radio bearer 1 of the UE2, and sets up a radio bearer 5 of the UE1 in correspondence to an identifier of the radio bearer 2 of the UE2, and the UE1 sets up a radio bearer 6 of the UE1 in correspondence to an identifier of the radio bearer 3 of the UE3. Then the UE1 separately sets up two short range bearers on the short range connection with the UE2, and the two short range bearers are separately mapped to the radio bearer 1 and the radio bearer 2, thereby distinguishing the short range bearers, in the UE1, on the short range connection between the UE1 and the UE2. Similarly, the UE2 also separately sets up two short range bearers on the short range connection with the UE1, and the two short range bearers are separately mapped to the radio bearer 1 and the radio bearer 2, thereby distinguishing the short range bearers, in the UE2, on the short range connection between the UE1 and the UE2. In addition, the UE1 sets up a short range bearer on the short range connection with the UE3, and the short range bearer is mapped to the radio bearer 3; similarly, the UE3 sets up a short range bearer on the short range connection with the UE1, and the short range bearer is mapped to the radio bearer 3. In this way, one-to-one mappings between the bearers enable the UE2 and the UE3 to distinguish a radio bearer corresponding to data transmission. The description herein is regarded in an illustrative sense but not a restrictive sense.

It should be noted that the foregoing mapping, for example, the mapping between the first radio bearer of the benefited UE and the short range bearer, represents that data on the first radio bearer (or the first radio sub-bearer) of the benefited UE can be transmitted to the short range bearer, or data from the short range bearer can be transmitted to the first radio bearer (or the first radio sub-bearer) of the benefited UE. For mappings between other bearers, reference is made to the description of the mapping between the first radio bearer of the benefited UE and the short range bearer, which are not described herein again.

In addition, the short range connection between the supporting UE and the benefited UE may be a short range communications technology such as WiFi, Bluetooth (Blue Tooth), or Zigbee, and may even be a wired network such as Ethernet, and in this case, the short range bearer between the benefited UE and the supporting UE is a bearer implemented by using a wired connection.

To sum up, in this embodiment of the present invention, a mapping between a first radio bearer (or a first radio sub-bearer) of a benefited UE and a short range bearer is established in the benefited UE, and a mapping between a second radio bearer of a supporting UE and the short range bearer also exists in the supporting UE; at the same time, a mapping between the first radio bearer or sub-bearer of the benefited UE and the second radio bearer of the supporting UE also exists in a base station.

By using downlink data transmission as an example, according to the mapping relationship between the first radio bearer (or the first radio sub-bearer) of the benefited UE and the second radio bearer of the supporting UE, the base station may choose to directly send data to the benefited UE by using the first radio bearer, or choose to send data to the supporting UE by using the second radio bearer of the supporting UE.

When the data is sent to the supporting UE, the data carries a second radio bearer identifier, so that the supporting UE can identify that the data corresponds to the second radio bearer, and the supporting UE sends the data to the benefited UE by using the short range bearer according to the mapping relationship between the second radio bearer and the short range bearer, where the data carries the first short range bearer identifier and/or the second short range bearer identifier. When receiving the data through the supporting UE, the benefited UE sends, by using the mapping between the short range bearer and the first radio bearer (or the first radio sub-bearer), the data to a protocol layer corresponding to the first radio bearer (or the first radio sub-bearer) of the benefited UE for processing.

Transmission of uplink data is similar to transmission of downlink data. The benefited UE may directly send uplink data to the base station by using the first radio bearer, and may also send the data to the supporting UE by using the short range bearer by using the mapping relationship between the first radio bearer and the short range bearer. Data sent by using the short range bearer carries the first short range bearer identifier and/or the second short range bearer identifier. When receiving the data, the supporting UE sends the data to the base station by using the second radio bearer by using the mapping between the short range bearer and the second radio bearer. The base station sends, according to the mapping relationship between the second radio bearer of the supporting UE and the first radio bearer (or the first radio sub-bearer) of the benefited UE, the data to the protocol layer corresponding to the first radio bearer (or the first radio sub-bearer) of the benefited UE for processing.

Finally, using the one-to-one mappings between the bearers, the benefited UE can distinguish, according to the mapping relationships between the bearers, a radio bearer corresponding to data transmission, thereby further processing the data and distinguishing different QoS.

Specifically, the one-to-one mappings between the bearers are implemented by using mappings between identifiers of the bearers. For example, when the base station sends downlink data to the supporting UE, the data may carry the second radio bearer identifier of the supporting UE, so that the supporting UE can identify that the data corresponds to the second radio bearer; the second radio bearer corresponds to the short range bearer, that is, the first short range bearer identifier needs to be added to the data sent by the supporting UE to the benefited UE, so that the benefited UE performs a mapping to the first radio bearer of the benefited UE according to the first short range bearer identifier, and then the benefited UE performs corresponding protocol processing on the data.

Further, the benefited UE and the supporting UE themselves may set up the short range bearer, and the benefited UE itself may establish the mapping between the short range bearer and the first radio bearer (or the first radio sub-bearer); in this case, the base station only sends the second reconfiguration message to the supporting UE to establish the mapping relationship between the short range bearer and the second radio bearer.

In the short range communications method that is executed by a benefited UE and provided in this embodiment of the present invention, a mapping relationship exists between a first radio bearer and a short range bearer, a mapping relationship exists between a second radio bearer and the short range bearer, and meanwhile, a mapping relationship exists between the first radio bearer and the second radio bearer; in this way, one-to-one mappings are formed between the bearers, so that a UE can distinguish, on a short range link, a radio bearer corresponding to transmission of data information and perform further processing.

Figure 2:
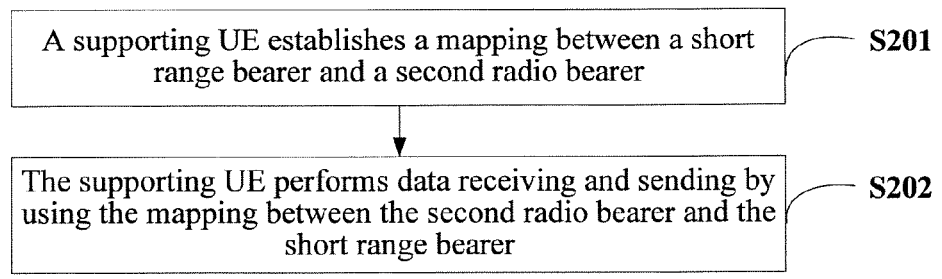
FIG. 2 is a schematic diagram of another short range communications method according to an embodiment of the present invention.

An embodiment of the present invention provides a short range communications method. As shown in FIG. 2, this embodiment of the present invention is executed by a supporting UE, and the method includes:

S201: A supporting UE establishes a mapping between a short range bearer and a second radio bearer.

The second radio bearer is a radio bearer set up for the supporting UE to assist a first radio bearer; the short range bearer is a bearer set up to assist the supporting UE in communication with a benefited UE; a mapping is performed between the short range bearer and the first radio bearer on a benefited UE side; the first radio bearer is a benefited radio bearer of the benefited UE; and a mapping is performed between the first radio bearer and the second radio bearer on a base station side.

It should be noted that the mapping between the short range bearer and the first radio bearer on the benefited UE side may be established by the benefited UE. Specifically, the benefited UE receives a first reconfiguration message sent by a base station, and establishes the mapping between the short range bearer and the first radio bearer according to the first reconfiguration message.

S202: The supporting UE performs data receiving and sending by using the mapping between the second radio bearer and the short range bearer.

Optionally, before establishing the mapping between the short range bearer and the second radio bearer, the supporting UE may also set up the second radio bearer, where the second radio bearer is set up and the mapping between the short range bearer and the second radio bearer is established in the following two manners:

Manner 1: The supporting UE receives a second reconfiguration message sent by the base station, and sets up the second radio bearer according to the second reconfiguration message; the supporting UE establishes the mapping between the short range bearer and the second radio bearer according to the second reconfiguration message.

Manner 2: The supporting UE receives a bearer setup message sent by the base station, and sets up the second radio bearer according to the bearer setup message; the supporting UE receives a second reconfiguration message sent by the base station, and establishes the mapping between the short range bearer and the second radio bearer according to the second reconfiguration message.

A difference between manner 1 and manner 2 is that: in manner 1, the supporting UE completes setup of the second radio bearer and establishment of the mapping between the short range bearer and the second radio bearer according to the second reconfiguration message sent by the base station; whereas in manner 2, the benefited UE sets up the first radio bearer by using the bearer setup message received from the base station, and establishes the mapping between the short range bearer and the second radio bearer by using the second reconfiguration message received from the base station. That is, in manner 1, setup of the second bearer and establishment of the mapping between the short range bearer and the second radio bearer are completed by using only one message; whereas in manner 2, setup of the second bearer and establishment of the mapping between the short range bearer and the second radio bearer are separately completed by using two messages.

Optionally, after the supporting UE receives the second reconfiguration message sent by the base station, the supporting UE sets up the short range bearer according to second short range bearer configuration information in the second reconfiguration message.

Specifically, the second short range bearer configuration information includes short range information (such as a frequency channel number) of the supporting UE.

It should be noted that the short range bearer may be set up by the benefited UE according to first short range bearer configuration information in the first reconfiguration message, and specifically, the first short range bearer configuration information includes short range information (such a frequency channel number) of the supporting UE.

In addition, that the base station controls the benefited UE or the supporting UE to set up the short range bearer specifically includes the following two cases:

Case 1: When the benefited UE initiates a service, the first radio bearer has not been set up; in this case, the short range bearer is set up at the same time as the benefited UE sets up the first radio bearer according to the first reconfiguration message.

Case 2: When the benefited UE initiates a service, the first radio bearer has been set up; in this case, the first radio bearer needs to be reconfigured, according to the first reconfiguration message, for the service initiated by the benefited UE, and the short range bearer is set up when the first radio bearer is reconfigured.

Optionally, the supporting UE acquires a second short range bearer identifier and a second radio bearer identifier that are configured by the base station, where the second short range bearer identifier corresponds to the short range bearer on a supporting UE side, and the second radio bearer identifier corresponds to the second radio bearer.

The supporting UE establishes the mapping between the short range bearer and the second radio bearer by using a mapping between the second short range bearer identifier and the second radio bearer identifier.

Further, the supporting UE sends the second short range bearer identifier to the benefited UE, so that when sending data to the supporting UE, the benefited UE adds the second short range bearer identifier to the data.

Specifically, when the benefited UE sends data to the supporting UE, the data may carry the second short range bearer identifier, so that the benefited UE can identify, according to the second short range bearer identifier, the short range bearer corresponding to the data and then perform processing.

Optionally, the supporting UE sends a first connection request message to the base station, so that the base station correspondingly configures the second radio bearer according to first benefited bearer information in the first connection request message.

The first benefited bearer information includes: an identifier of the benefited UE, a first radio bearer identifier, and a first short range bearer identifier and/or the second short range bearer identifier, where the first short range bearer identifier is an identifier corresponding to the short range bearer on the benefited UE side.

Further, when a preset condition is satisfied, the benefited UE or the supporting UE sends a release request message to the base station, and after the base station receives the release request message, the supporting UE receives a release message sent by the base station; or the benefited UE sends a release request message to the base station, and after the base station receives the release request message, the supporting UE and the benefited UE receive a release message sent by the base station.

For example, when a distance between the supporting UE and the benefited UE exceeds a preset distance, the base station receives a release request message sent by the supporting UE or the benefited UE, and sends a release message to the supporting UE according to the release request message, so that the supporting UE releases the corresponding second radio bearer and the mapping relationship between the second radio bearer and the short range bearer. The preset distance may be set according to an actual application or an empirical value. The base station deletes the second radio bearer of the supporting UE and a mapping between the second radio bearer and a first short range bearer, and the base station deletes a mapping between the first radio bearer of the benefited UE and the first short range bearer.

Specifically, the supporting UE may delete the short range bearer according to the release message, and deletion of the short range bearer may also lead to deletion of the second radio bearer. Certainly, the base station may also send a reconfiguration message to the benefited UE, so that the benefited UE deletes the mapping relationship between the first radio bearer or sub-bearer and the first short range bearer. Specifically, the short range bearer between the benefited UE and the supporting UE may also be deleted. If all short range bearers between the benefited UE and the supporting UE are deleted, correspondingly, a short range connection between the benefited UE and the supporting UE is also deleted.

For another example, when the first radio bearer of the benefited UE is deleted because the benefited UE cancels a corresponding service, the base station receives a release request message sent by the benefited UE, and sends a release message to the supporting UE and the benefited UE according to the release request message. The base station deletes the second radio bearer of the supporting UE and the mapping between the second radio bearer and the first short range bearer, and the base station deletes the mapping between the first radio bearer of the benefited UE and the first short range bearer.

Specifically, the supporting UE or the benefited UE (the supporting UE or the benefited UE may be configured according to an actual application) may delete the short range bearer according to the release message, and deletion of the short range bearer may also lead to deletion of the second radio bearer and the first radio sub-bearer. In addition, if all short range bearers are deleted, correspondingly, a short range connection is deleted.

The following describes that the benefited UE and the supporting UE distinguish the short range bearer by using the second short range bearer identifier.

The short range bearer is distinguished by using the second short range bearer identifier mainly in the following three manners:

Manner 1: The second short range bearer identifier is included in an Ether type field of a Media Access Control layer MAC layer or a Logical Link Control LLC layer of the supporting UE.

For example, by using an LTE system as an example, the maximum number of the first short range bearer identifiers does not exceed 16, and generally is less than 8; therefore, the second short range bearer identifier (for example, 8 second short range bearer identifiers) may be directly defined in the Ether type field to correspond to different short range bearers.

This manner has an advantage of avoiding definition of a new protocol layer.

Manner 2: The second short range bearer identifier is included in a protocol layer indicated by an Ether type field of a MAC layer or an LLC layer of the supporting UE.

The protocol layer herein is a newly defined protocol layer, and the protocol layer is indicated by the Ether type field.

This manner has advantages of lower latency and high data processing efficiency, but has a disadvantage of greater impact on an existing protocol.

Manner 3: The second short range bearer identifier is included in a protocol layer that is indicated by a field of a network layer or a transport layer indicated by an Ether type field of a MAC layer or an LLC layer of the supporting UE.

The protocol layer herein is also a newly defined protocol layer, the Ether type field indicates the field of the network layer or transport layer, and the field of the network layer or transport layer indicates the newly defined protocol layer.

Mainly in this manner, the protocol layer is defined above a higher layer of a protocol stack, which has an advantage of small impact on an existing protocol, but has disadvantages of higher latency, low data processing efficiency, and dependence on an operating system of the higher layer.

In addition, if the Ether type field is included in the MAC layer, the LLC layer may not be required.

It should be noted that establishment of each bearer identifier cannot be used repeatedly in a same UE, but can be used repeatedly in different UEs.

That is, when one UE corresponds to multiple bearers, each bearer corresponds to a different bearer identifier; however, for two different UEs, bearers of the two different UEs may correspond to a same bearer identifier.

For example, it is assumed that one supporting UE (marked as a UE1) corresponds to two benefited UEs (separately marked as a UE2 and a UE3), a short range connection may be established between the UE1 and the UE2, and a short range connection may be established between the UE1 and the UE3. If the UE2 includes two radio bearers (marked as a radio bearer 1 and a radio bearer 2), and the UE3 includes one radio bearer (marked as a radio bearer 3), the UE1 sets up a radio bearer 4 of the UE1 in correspondence to an identifier of the radio bearer 1 of the UE2, and sets up a radio bearer 5 of the UE1 in correspondence to an identifier of the radio bearer 2 of the UE2, and the UE1 sets up a radio bearer 6 of the UE1 in correspondence to an identifier of the radio bearer 3 of the UE3. Then the UE1 separately sets up two short range bearers on the short range connection with the UE2, and the two short range bearers are separately mapped to the radio bearer 1 and the radio bearer 2, thereby distinguishing the short range bearers, in the UE1, on the short range connection between the UE1 and the UE2. Similarly, the UE2 also separately sets up two short range bearers on the short range connection with the UE1, and the two short range bearers are separately mapped to the radio bearer 1 and the radio bearer 2, thereby distinguishing the short range bearers, in the UE2, on the short range connection between the UE1 and the UE2. In addition, the UE1 sets up a short range bearer on the short range connection with the UE3, and the short range bearer is mapped to the radio bearer 3; similarly, the UE3 sets up a short range bearer on the short range connection with the UE1, and the short range bearer is mapped to the radio bearer 3. In this way, one-to-one mappings between the bearers enable the UE2 and the UE3 to distinguish a radio bearer corresponding to data transmission. The description herein is regarded in an illustrative sense but not a restrictive sense.

It should be noted that the foregoing mapping, for example, the mapping between the first radio bearer of the benefited UE and the short range bearer, represents that data on the first radio bearer (or the first radio sub-bearer) of the benefited UE can be transmitted to the short range bearer, or data from the short range bearer can be transmitted to the first radio bearer (or the first radio sub-bearer) of the benefited UE. For mappings between other bearers, reference is made to the description of the mapping between the first radio bearer of the benefited UE and the short range bearer, which are not described herein again.

In addition, the short range connection between the supporting UE and the benefited UE may be a short range communications technology such as WiFi, Bluetooth (Blue Tooth), or Zigbee, and may even be a wired network such as Ethernet, and in this case, the short range bearer between the benefited UE and the supporting UE is a bearer implemented by using a wired connection.

To sum up, in this embodiment of the present invention, a mapping between a second radio bearer of a supporting UE and a short range bearer is established in the supporting UE, and a mapping between a first radio bearer (or a first radio sub-bearer) of a benefited UE and the short range bearer also exists in the benefited UE; at the same time, a mapping between the first radio bearer or sub-bearer of the benefited UE and the second radio bearer of the supporting UE also exists in a base station.

By using downlink data transmission as an example, according to the mapping relationship between the first radio bearer (or the first radio sub-bearer) of the benefited UE and the second radio bearer of the supporting UE, the base station may choose to directly send data to the benefited UE by using the first radio bearer, or choose to send data to the supporting UE by using the second radio bearer of the supporting UE.

When the data is sent to the supporting UE, the data carries the second radio bearer identifier, so that the supporting UE can identify that the data corresponds to the second radio bearer, and the supporting UE sends the data to the benefited UE by using the short range bearer according to the mapping relationship between the second radio bearer and the short range bearer, where the data carries the first short range bearer identifier and/or the second short range bearer identifier. When receiving the data through the supporting UE, the benefited UE sends, by using the mapping between the short range bearer and the first radio bearer (or the first radio sub-bearer), the data to a protocol layer corresponding to the first radio bearer (or the first radio sub-bearer) of the benefited UE for processing.

Transmission of uplink data is similar to transmission of downlink data. The benefited UE may directly send uplink data to the base station by using the first radio bearer, and may also send the data to the supporting UE by using the short range bearer by using the mapping relationship between the first radio bearer and the short range bearer. Data sent by using the short range bearer carries the first short range bearer identifier and/or the second short range bearer identifier. When receiving the data, the supporting UE sends the data to the base station by using the second radio bearer by using the mapping between the short range bearer and the second radio bearer. The base station sends, according to the mapping relationship between the second radio bearer of the supporting UE and the first radio bearer (or the first radio sub-bearer) of the benefited UE, the data to the protocol layer corresponding to the first radio bearer (or the first radio sub-bearer) of the benefited UE for processing.

Finally, using the one-to-one mappings between the bearers, the benefited UE can distinguish, according to the mapping relationships between the bearers, a radio bearer corresponding to data transmission, thereby further processing the data and distinguishing different QoS.

Specifically, the one-to-one mappings between the bearers are implemented by using mappings between identifiers of the bearers. For example, when the base station sends downlink data to the supporting UE, the data may carry the second radio bearer identifier of the supporting UE, so that the supporting UE can identify that the data corresponds to the second radio bearer; the second radio bearer corresponds to the short range bearer, that is, the first short range bearer identifier needs to be added to the data sent by the supporting UE to the benefited UE, so that the benefited UE performs a mapping to the first radio bearer of the benefited UE according to the first short range bearer identifier, and then the benefited UE performs corresponding protocol processing on the data.

Further, the benefited UE and the supporting UE themselves may set up the short range bearer, and the benefited UE itself may establish the mapping between the short range bearer and the first radio bearer (or the first radio sub-bearer); in this case, the base station only sends the second reconfiguration message to the supporting UE to establish the mapping relationship between the short range bearer and the second radio bearer.

In the short range communications method, device, and system that are executed by a supporting UE and provided in this embodiment of the present invention, a mapping relationship exists between a first radio bearer and a short range bearer, a mapping relationship exists between a second radio bearer and the short range bearer, and meanwhile, a mapping relationship exists between the first radio bearer and the second radio bearer; in this way, one-to-one mappings are formed between the bearers, so that a UE can distinguish, on a short range link, a radio bearer corresponding to transmission of data information and perform further processing.

Figure 3:
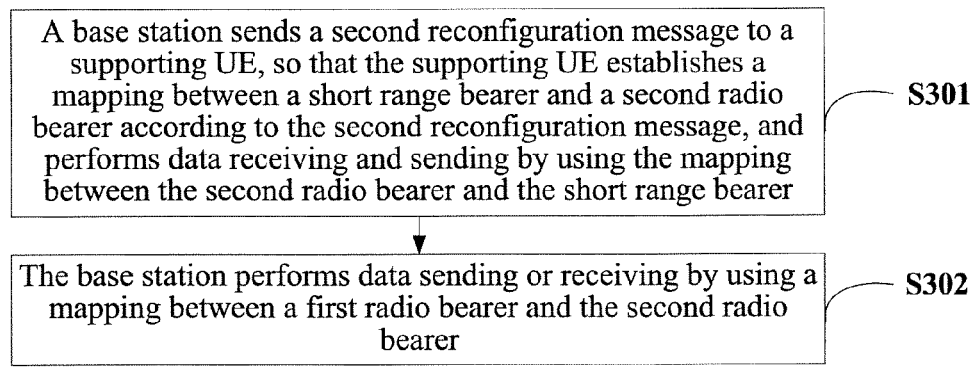
FIG. 3 is a schematic diagram of another short range communications method according to an embodiment of the present invention.

An embodiment of the present invention provides a short range communications method. As shown in FIG. 3, this embodiment is executed by a base station, and the method includes:

S301: A base station sends a second reconfiguration message to a supporting UE, so that the supporting UE establishes a mapping between a short range bearer and a second radio bearer according to the second reconfiguration message, and performs data receiving and sending by using the mapping between the second radio bearer and the short range bearer.

The second radio bearer is a radio bearer set up for the supporting UE to assist a first radio bearer; the short range bearer is a bearer set up to assist the supporting UE in communication with a benefited UE; the first radio bearer is a benefited radio bearer of the benefited UE, and a mapping is performed between the first radio bearer and the short range bearer on a benefited UE side; and a mapping is performed between the first radio bearer and the second radio bearer on a base station side.

The benefited UE and the supporting UE themselves may set up the short range bearer, and the benefited UE itself may establish the mapping between the short range bearer and the first radio bearer.

S302: The base station performs data sending or receiving by using a mapping between a first radio bearer and the second radio bearer.

Optionally, the first radio bearer is a benefited radio bearer of the benefited UE, and the mapping between the first radio bearer and the short range bearer on the benefited UE side may also be established by the benefited UE. Specifically, the base station sends a first reconfiguration message to the benefited UE, so that the benefited UE establishes the mapping between the short range bearer and the first radio bearer according to the first reconfiguration message, and performs data receiving and sending by using the mapping between the first radio bearer and the short range bearer.

Optionally, the short range bearer may be set up in the following two manners:

Manner 1: The base station sends first short range bearer configuration information to the benefited UE, so that the benefited UE sets up the short range bearer according to the first short range bearer configuration information.

Manner 2: The base station sends the second reconfiguration message to the supporting UE, including: the base station sends second short range bearer configuration information to the supporting UE, so that the supporting UE sets up the short range bearer according to the second short range bearer configuration information.

In addition, that the base station controls the benefited UE or the supporting UE to set up the short range bearer specifically includes the following two cases:

Case 1: When the benefited UE initiates a service, the first radio bearer has not been set up; in this case, the short range bearer is set up at the same time as the benefited UE sets up the first radio bearer according to the first reconfiguration message.

Case 2: When the benefited UE initiates a service, the first radio bearer has been set up; in this case, the first radio bearer needs to be reconfigured, according to the first reconfiguration message, for the service initiated by the benefited UE, and the short range bearer is set up when the first radio bearer is reconfigured.

Further, the base station configures a first short range bearer identifier and a first radio bearer identifier, and sends them to the benefited UE, where the first short range bearer identifier corresponds to the short range bearer, and the first radio bearer identifier corresponds to the first radio bearer, so that the benefited UE establishes the mapping between the short range bearer and the first radio bearer according to the first short range bearer identifier and the first radio bearer identifier.

The base station configures a second short range bearer identifier and a second radio bearer identifier, and sends them to the supporting UE, where the second short range bearer identifier corresponds to the short range bearer, and the second radio bearer identifier corresponds to the second radio bearer, so that the supporting UE establishes the mapping between the short range bearer and the second radio bearer according to the second short range bearer identifier and the second radio bearer identifier.

Optionally, the base station sends the first reconfiguration message to the benefited UE, so that the benefited UE establishes a mapping between the short range bearer and a first radio sub-bearer according to the first reconfiguration message, where the first radio sub-bearer is a bearer in a one-to-one correspondence to the second radio bearer in the first radio bearer.

Further, configuration of the second radio bearer on the base station side includes, but is not limited to, the following two manners:

Manner 1: Before the base station sends the second reconfiguration message to the supporting UE, the base station receives a first connection request message sent by the supporting UE, and correspondingly configures the second radio bearer according to first benefited bearer information in the first connection request message, where the first benefited bearer information includes: an identifier of the benefited UE, the first radio bearer identifier, and the first short range bearer identifier and/or the second short range bearer identifier.

Manner 2: The base station receives a second connection request message sent by the benefited UE, and correspondingly configures the second radio bearer according to second benefited bearer information in the second connection request message, where the second benefited bearer information includes: an identifier of the supporting UE, the first radio bearer identifier, and the first short range bearer identifier and/or the second short range bearer identifier.

Further, when a preset condition is satisfied, the benefited UE or the supporting UE sends a release request message to the base station, and after the base station receives the release request message, the supporting UE receives a release message sent by the base station; or the benefited UE sends a release request message to the base station, and after the base station receives the release request message, the supporting UE and the benefited UE receive a release message sent by the base station.

For example, when a distance between the supporting UE and the benefited UE exceeds a preset distance, the base station receives a release request message sent by the supporting UE or the benefited UE, and sends a release message to the supporting UE according to the release request message, so that the supporting UE releases the corresponding second radio bearer, and the mapping relationship between the second radio bearer and the short range bearer. The preset distance may be set according to an actual application or an empirical value. The base station deletes the second radio bearer of the supporting UE and a mapping between the second radio bearer and a first short range bearer, and the base station deletes a mapping between the first radio bearer of the benefited UE and the first short range bearer.

Specifically, the supporting UE may delete the short range bearer according to the release message, and deletion of the short range bearer may also lead to deletion of the second radio bearer. Certainly, the base station may also send a reconfiguration message to the benefited UE, so that the benefited UE deletes the mapping relationship between the first radio bearer or sub-bearer and the first short range bearer. Specifically, the short range bearer between the benefited UE and the supporting UE may also be deleted. If all short range bearers between the benefited UE and the supporting UE are deleted, correspondingly, a short range connection between the benefited UE and the supporting UE is also deleted.

For another example, when the first radio bearer of the benefited UE is deleted because the benefited UE cancels a corresponding service, the base station receives a release request message sent by the benefited UE, and sends a release message to the supporting UE and the benefited UE according to the release request message. The base station deletes the second radio bearer of the supporting UE and the mapping between the second radio bearer and the first short range bearer, and the base station deletes the mapping between the first radio bearer of the benefited UE and the first short range bearer.

Specifically, the supporting UE or the benefited UE (the supporting UE or the benefited UE may be configured according to an actual application) may delete the short range bearer according to the release message, and deletion of the short range bearer may also lead to deletion of the second radio bearer and the first radio sub-bearer. In addition, if all short range bearers are deleted, correspondingly, a short range connection is deleted.

The following describes that the benefited UE and the supporting UE distinguish the short range bearer by using the first short range bearer identifier.

The short range bearer is distinguished by using the first short range bearer identifier mainly in the following three manners:

Manner 1: The first short range bearer identifier is included in an Ether type field of a MAC layer or an LLC layer of the benefited UE.

For example, by using an LTE system as an example, the maximum number of the first short range bearer identifiers does not exceed 16, and generally is less than 8; therefore, the first short range bearer identifier (for example, 8 first short range bearer identifiers) may be directly defined in the Ether type field to correspond to different short range bearers.

This manner has an advantage of avoiding definition of a new protocol layer.

Manner 2: The first short range bearer identifier is included in a protocol layer indicated by an Ether type field of a MAC layer or an LLC layer of the benefited UE.

The protocol layer herein is a newly defined protocol layer, and the protocol layer is indicated by the Ether type field.

This manner has advantages of lower latency and high data processing efficiency, but has a disadvantage of greater impact on an existing protocol.

Manner 3: The first short range bearer identifier is included in a protocol layer indicated by a field of a network layer or transport layer of the benefited UE.

The protocol layer herein is also a newly defined protocol layer, the Ether type field indicates the field of the network layer or transport layer, and the field of the network layer or transport layer indicates the newly defined protocol layer.

Mainly in this manner, the protocol layer is defined above a higher layer of a protocol stack, which has an advantage of small impact on an existing protocol, but has disadvantages of higher latency, low data processing efficiency, and dependence on an operating system of the higher layer.

Similarly, the second short range bearer identifier correspondingly includes the following three manners:

Manner 1: The second short range bearer identifier is included in an Ether type field of a MAC layer or an LLC layer of the supporting UE.

Manner 2: The second short range bearer identifier is included in a protocol layer indicated by an Ether type field of a MAC layer or an LLC layer of the supporting UE.

Manner 3: The second short range bearer identifier is included in a protocol layer that is indicated by a field of a network layer or a transport layer indicated by an Ether type field of a MAC layer or an LLC layer of the supporting UE.

For specific descriptions, refer to the foregoing descriptions of the first short range bearer identifier, and details are not described herein again.

In addition, if the Ether type field is included in the MAC layer, the LLC layer may not be required.

To sum up, in this embodiment of the present invention, a mapping between a second radio bearer of a supporting UE and a short range bearer is established in the supporting UE, and a mapping between a first radio bearer (or a first radio sub-bearer) of a benefited UE and the short range bearer is established in the benefited UE; at the same time, a mapping between the first radio bearer or sub-bearer of the benefited UE and the second radio bearer of the supporting UE also exists in a base station.

By using downlink data transmission as an example, according to the mapping relationship between the first radio bearer (or the first radio sub-bearer) of the benefited UE and the second radio bearer of the supporting UE, the base station may choose to directly send data to the benefited UE by using the first radio bearer, or choose to send data to the supporting UE by using the second radio bearer of the supporting UE.

When the data is sent to the supporting UE, the data carries the second radio bearer identifier, so that the supporting UE can identify that the data corresponds to the second radio bearer, and the supporting UE sends the data to the benefited UE by using the short range bearer according to the mapping relationship between the second radio bearer and the short range bearer, where the data carries the first short range bearer identifier and/or the second short range bearer identifier. When receiving the data through the supporting UE, the benefited UE sends, by using the mapping between the short range bearer and the first radio bearer (or the first radio sub-bearer), the data to a protocol layer corresponding to the first radio bearer (or the first radio sub-bearer) of the benefited UE for processing.

Transmission of uplink data is similar to transmission of downlink data. The benefited UE may directly send uplink data to the base station by using the first radio bearer, and may also send the data to the supporting UE by using the short range bearer by using the mapping relationship between the first radio bearer and the short range bearer. Data sent by using the short range bearer carries the first short range bearer identifier and/or the second short range bearer identifier. When receiving the data, the supporting UE sends the data to the base station by using the second radio bearer by using the mapping between the short range bearer and the second radio bearer. The base station sends, according to the mapping relationship between the second radio bearer of the supporting UE and the first radio bearer (or the first radio sub-bearer) of the benefited UE, the data to the protocol layer corresponding to the first radio bearer (or the first radio sub-bearer) of the benefited UE for processing.

In the short range communications method, device, and system that are executed by a base station provided in this embodiment of the present invention, a mapping relationship exists between a first radio bearer and a short range bearer, a mapping relationship exists between a second radio bearer and the short range bearer, and meanwhile, a mapping relationship exists between the first radio bearer and the second radio bearer; in this way, one-to-one mappings are formed between the bearers, so that a UE can distinguish, on a short range link, a radio bearer corresponding to transmission of data information and perform further processing.

Figure 4:
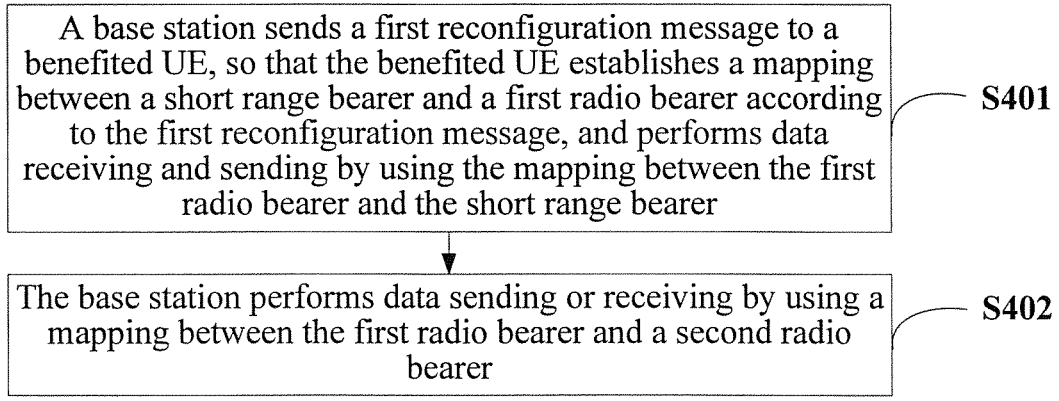
FIG. 4 is a schematic diagram of another short range communications method according to an embodiment of the present invention.

An embodiment of the present invention provides a short range communications method. As shown in FIG. 4, the method is executed by a base station, and the method includes:

S401: A base station sends a first reconfiguration message to a benefited UE, so that the benefited UE establishes a mapping between a short range bearer and a first radio bearer according to the first reconfiguration message, and performs data receiving and sending by using the mapping between the first radio bearer and the short range bearer.

The first radio bearer is a benefited radio bearer of the benefited UE; the short range bearer is a bearer set up to assist a supporting UE in communication with the benefited UE; a mapping is performed between the short range bearer and a second radio bearer on a supporting UE side; the second radio bearer is a radio bearer set up for the supporting UE to assist the first radio bearer; and a mapping is performed between the first radio bearer and the second radio bearer on a base station side.

S402: The base station performs data sending or receiving by using a mapping between the first radio bearer and a second radio bearer.

In the short range communications method that is executed by a base station and provided in this embodiment of the present invention, a mapping relationship exists between a first radio bearer and a short range bearer, a mapping relationship exists between a second radio bearer and the short range bearer, and meanwhile, a mapping relationship exists between the first radio bearer and the second radio bearer; in this way, one-to-one mappings are formed between the bearers, so that a UE can distinguish, on a short range link, a radio bearer corresponding to transmission of data information and perform further processing.

Figure 5:
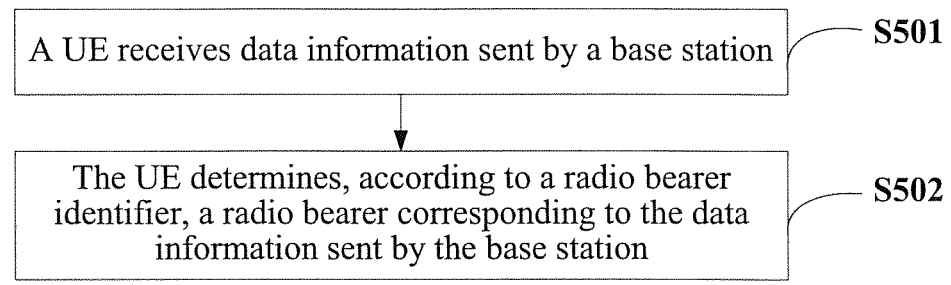
FIG. 5 is a schematic diagram of another short range communications method according to an embodiment of the present invention.

An embodiment of the present invention provides a short range communications method. As shown in FIG. 5, the method is executed by a UE, and the method includes:

S501: A UE receives data information sent by a base station.

The data information carries a radio bearer identifier configured in the base station, where the radio bearer identifier corresponds to a radio bearer set up by the UE.

S502: The UE determines, according to a radio bearer identifier, a radio bearer corresponding to the data information sent by the base station.

Further, the radio bearer identifier is included in a PDCP (Packet Data Convergence Protocol, Packet Data Convergence Protocol) layer of the base station, or a protocol layer above the PDCP layer, or a protocol layer between the PDCP layer and an RLC (Radio Link Control, Radio Link Control) layer, or the RLC layer, or a protocol layer between the RLC layer and a MAC layer, or the MAC layer, or a protocol layer between the MAC layer and a PHY layer, or the PHY layer.

It should be noted that the UE may be a benefited UE.

In this way, a base station adds a radio bearer identifier to data information, so that when receiving the data information, a UE determines, according to the radio bearer identifier, a radio bearer corresponding to transmission of the data information, and then the UE can distinguish, on a short range link, a radio bearer corresponding to transmission of data information and perform corresponding processing.

Figure 6:
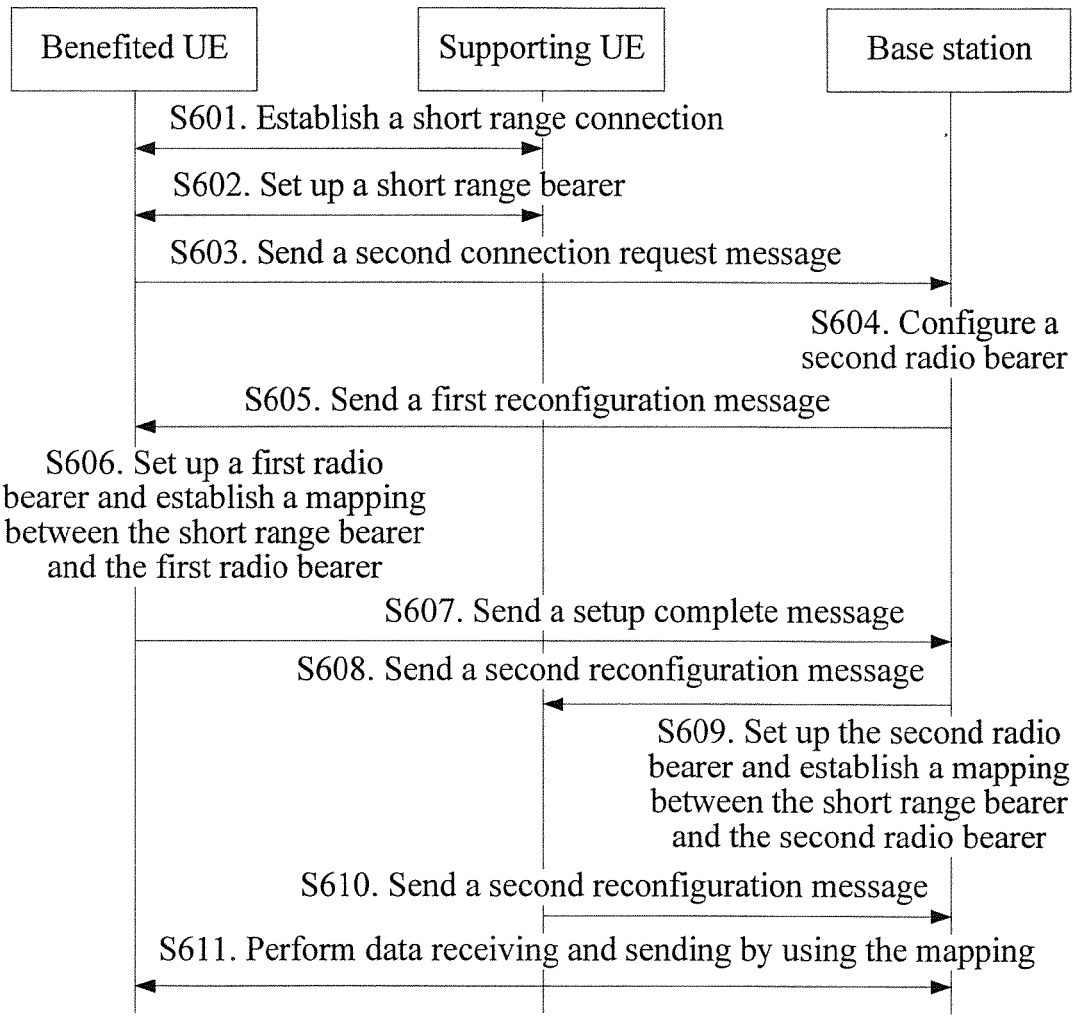
FIG. 6 is a schematic flowchart of a short range communications method according to an embodiment of the present invention.

An embodiment of the present invention provides a short range communications method. As shown in FIG. 6, this embodiment is described by using one benefited UE as an example. The present invention includes, but is not limited to, a case of one benefited UE. The method includes:

S601: A benefited UE establishes a short range connection with a supporting UE.

S602: The benefited UE sets up a short range bearer with the supporting UE.

S603: The benefited UE sends a second connection request message to a base station.

S604: The base station configures a second radio bearer according to second benefited bearer information in the second connection request message.

S605: The base station sends a first reconfiguration message to the benefited UE.

S606: The benefited UE sets up a first radio bearer and establishes a mapping between the short range bearer and the first radio bearer according to the first reconfiguration message.

Specifically, the benefited UE acquires, from the base station, a first short range bearer identifier and a first radio sub-bearer identifier that are configured by the base station, where the first short range bearer identifier corresponds to the short range bearer on a benefited UE side, and the first radio bearer identifier corresponds to the first radio bearer. The benefited UE establishes the mapping between the short range bearer and the first radio bearer by using a mapping between the first short range bearer identifier and the first radio bearer identifier.

The short range bearer is distinguished by using the first short range bearer identifier mainly in the following three manners:

Manner 1: The first short range bearer identifier is included in an Ether type field of a MAC layer or an LLC layer of the benefited UE.

For example, by using an LTE system as an example, the maximum number of the first short range bearer identifiers does not exceed 16, and generally is less than 8; therefore, the first short range bearer identifier (for example, 8 first short range bearer identifiers) may be directly defined in the Ether type field to correspond to different short range bearers.

This manner has an advantage of avoiding definition of a new protocol layer.

Manner 2: The first short range bearer identifier is included in a protocol layer indicated by an Ether type field of a MAC layer or an LLC layer of the benefited UE.

The protocol layer herein is a newly defined protocol layer, and the protocol layer is indicated by the Ether type field.

This manner has advantages of lower latency and high data processing efficiency, but has a disadvantage of greater impact on an existing protocol.

Manner 3: The first short range bearer identifier is included in a protocol layer that is indicated by a field of a network layer or a transport layer indicated by an Ether type field of a MAC layer or an LLC layer of the benefited UE.

The protocol layer herein is also a newly defined protocol layer, the Ether type field indicates the field of the network layer or transport layer, and the field of the network layer or transport layer indicates the newly defined protocol layer.

Mainly in this manner, the protocol layer is defined above a higher layer of a protocol stack, which has an advantage of small impact on an existing protocol, but has disadvantages of higher latency, low data processing efficiency, and dependence on an operating system of the higher layer.

It should be noted that, if the Ether type field is included in the MAC layer, the LLC layer may not be required.

In addition, the benefited UE sends the first short range bearer identifier to the supporting UE; in this way, when the supporting UE sends data to the benefited UE, the data may carry the first short range bearer identifier, so that the benefited UE can identify, according to the first short range bearer identifier, a short range bearer corresponding to the data and perform processing.

Optionally, the benefited UE establishes a mapping between the short range bearer and a first radio sub-bearer. The first radio sub-bearer is a bearer in a one-to-one correspondence to the second radio bearer in the first radio bearer.

Further, before the benefited UE establishes the mapping between the short range bearer and the first radio sub-bearer, the benefited UE sets up the first radio sub-bearer, where the number of the first radio sub-bearers is the same as the number of the supporting UEs.

S607: The benefited UE sends a setup complete message to the base station.

S608: The base station sends a second reconfiguration message to the supporting UE.

S609: The supporting UE sets up the second radio bearer and establishes a mapping between the short range bearer and the second radio bearer according to the second reconfiguration message.

Specifically, the supporting UE acquires, from the base station, a second radio bearer identifier and a second short range bearer identifier that are configured by the base station. The second short range bearer identifier corresponds to the short range bearer on a supporting UE side, and the second radio bearer identifier corresponds to the second radio bearer; and then the supporting UE establishes the mapping between the short range bearer and the second radio bearer by using a mapping between the second short range bearer identifier and the second radio bearer identifier.

Similarly, the second short range bearer identifier correspondingly includes the following three manners:

Manner 1: The second short range bearer identifier is included in an Ether type field of a MAC layer or an LLC layer of the assisting UE.

Manner 2: The second short range bearer identifier is included in a protocol layer indicated by an Ether type field of a MAC layer or an LLC layer of the assisting UE.

Manner 3: The second short range bearer identifier is included in a protocol layer that is indicated by a field of a network layer or a transport layer indicated by an Ether type field of a MAC layer or an LLC layer of the assisting UE.

For specific descriptions, refer to the foregoing descriptions of the first short range bearer identifier, and details are not described herein again.

In addition, the supporting UE sends the second short range bearer identifier to the benefited UE; in this way, when the benefited UE sends data to the supporting UE, the data may carry the second short range bearer identifier, so that the supporting UE can identify, according to the second short range bearer identifier, a short range bearer corresponding to the data and perform processing.

S610: The supporting UE sends a setup complete message to the base station.

It should be noted that step S605 to step S607 and step S608 to step S610 are independent processes, are not restricted by an absolute sequence, and may be performed simultaneously.

A mapping is performed between the first radio bearer and the second radio bearer on a base station side.

S611: The base station performs data receiving and sending by using a mapping between the first radio bearer and the second radio bearer, the benefited UE performs data receiving and sending by using the mapping between the first radio bearer and the short range bearer, and the supporting UE performs data receiving and sending by using the mapping between the second radio bearer and the short range bearer.

Further, when a preset condition is satisfied, the benefited UE or the supporting UE sends a release request message to the base station, and after the base station receives the release request message, the supporting UE receives a release message sent by the base station; or the benefited UE sends a release request message to the base station, and after the base station receives the release request message, the supporting UE and the benefited UE receive a release message sent by the base station.

For example, when a distance between the supporting UE and the benefited UE exceeds a preset distance, the base station receives a release request message sent by the supporting UE or the benefited UE, and sends a release message to the supporting UE according to the release request message, so that the supporting UE releases the corresponding second radio bearer, and the mapping relationship between the second radio bearer and the short range bearer. The preset distance may be set according to an actual application or an empirical value. The base station deletes the second radio bearer of the supporting UE and a mapping between the second radio bearer and a first short range bearer, and the base station deletes a mapping between the first radio bearer of the benefited UE and the first short range bearer.

Specifically, the supporting UE may delete the short range bearer according to the release message, and deletion of the short range bearer may also lead to deletion of the second radio bearer. Certainly, the base station may also send a reconfiguration message to the benefited UE, so that the benefited UE deletes the mapping relationship between the first radio bearer or sub-bearer and the first short range bearer. Specifically, the short range bearer between the benefited UE and the supporting UE may also be deleted. If all short range bearers between the benefited UE and the supporting UE are deleted, correspondingly, a short range connection between the benefited UE and the supporting UE is also deleted.

For another example, when the first radio bearer of the benefited UE is deleted because the benefited UE cancels a corresponding service, the base station receives a release request message sent by the benefited UE, and sends a release message to the supporting UE and the benefited UE according to the release request message. The base station deletes the second radio bearer of the supporting UE and the mapping between the second radio bearer and the first short range bearer, and the base station deletes the mapping between the first radio bearer of the benefited UE and the first short range bearer.

Specifically, the supporting UE or the benefited UE (the supporting UE or the benefited UE may be configured according to an actual application) may delete the short range bearer according to the release message, and deletion of the short range bearer may also lead to deletion of the second radio bearer and the first radio sub-bearer. In addition, if all short range bearers are deleted, correspondingly, a short range connection is deleted.

It should be noted that, if the benefited UE is switched to an idle state (for example, there is no service interaction), the supporting UE may also be switched to the idle state; in this case, the short range bearer is maintained. In this way, when the benefited UE and the supporting UE are switched to an active state (for example, the benefited UE initiates service interaction), no short range bearer needs to be set up again, thereby simplifying an information interaction process, and improving user experience.

In addition, if the short range bearer is unavailable, a short range connection, of the supporting UE, corresponding to the short range bearer is deleted.

If a new supporting UE is added, a short range bearer is set up for the new supporting UE.

Further, when the benefited UE is switched from the idle state to the active state, the supporting UE is also switched to the active state, and then step S602 to step S611 are triggered.

In addition, the short range connection between the supporting UE and the benefited UE may be a short range communications technology such as WiFi, Bluetooth (Blue Tooth), or Zigbee, and may even be a wired network such as Ethernet, and in this case, the short range bearer between the benefited UE and the supporting UE is a bearer implemented by using a wired connection.

By using the foregoing steps, one-to-one mappings are formed between bearers, so that a UE can distinguish, on a short range link, a radio bearer corresponding to transmission of data information and perform corresponding processing.

It should be noted that, for ease of description, the foregoing method embodiments are described as a series of action combinations. However, a person skilled in the art should understand that the present invention is not limited to the described sequence of the actions, because some steps may be performed in another sequence or performed at the same time according to the present invention. In addition, a person skilled in the art should also understand that all the embodiments described in this specification belong to exemplary embodiments, and the involved actions and modules are not necessarily mandatory to the present invention.

Figure 7:
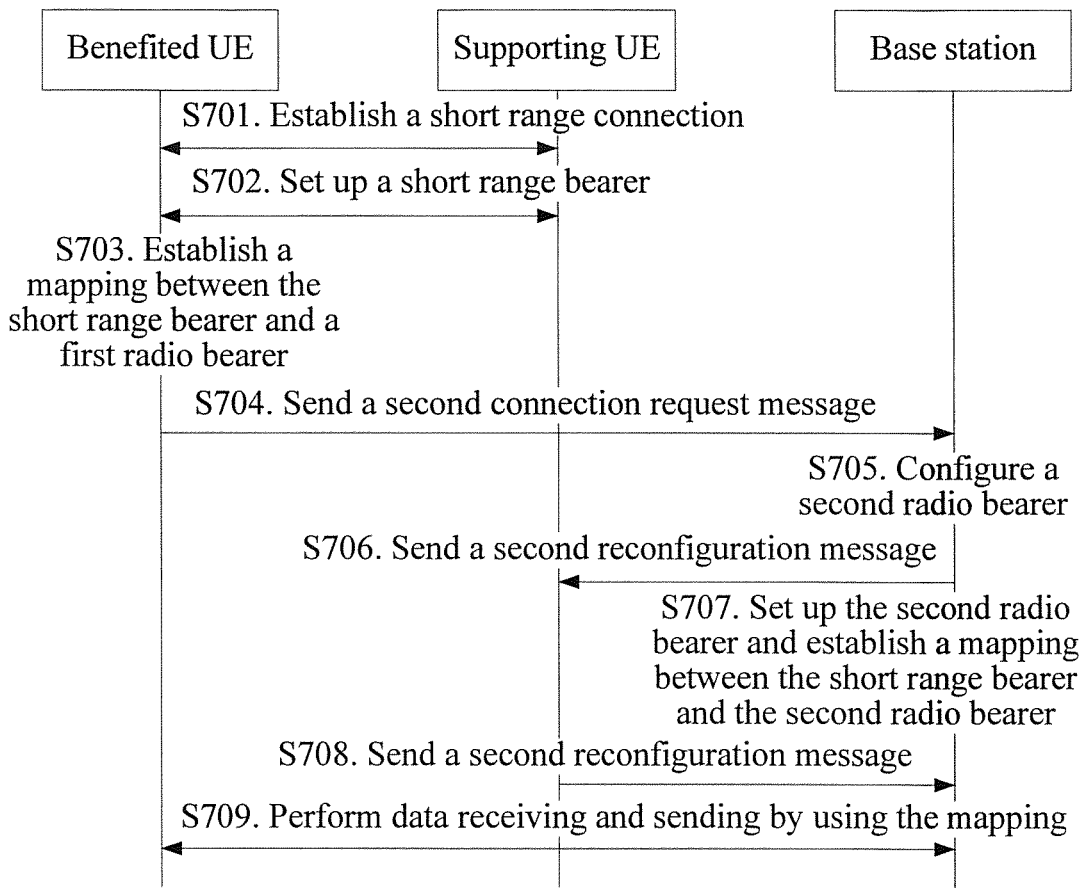
FIG. 7 is a schematic flowchart of another short range communications method according to an embodiment of the present invention.

An embodiment of the present invention provides a short range communications method. As shown in FIG. 7, this embodiment is described by using one benefited UE as an example. The present invention includes, but is not limited to, a case of one benefited UE. The method includes:

S701: A benefited UE establishes a short range connection with a supporting UE.

S702: The benefited UE sets up a short range bearer with the supporting UE.

S703: The benefited UE itself establishes a mapping between the short range bearer and a first radio bearer.

Specifically, the benefited UE acquires, from a base station, a first short range bearer identifier and a first radio sub-bearer identifier that are configured by the base station, where the first short range bearer identifier corresponds to the short range bearer on a benefited UE side, and the first radio bearer identifier corresponds to the first radio bearer. The benefited UE establishes the mapping between the short range bearer and the first radio bearer by using a mapping between the first short range bearer identifier and the first radio bearer identifier.

The short range bearer is distinguished by using the first short range bearer identifier mainly in the following three manners:

Manner 1: The first short range bearer identifier is included in an Ether type field of a MAC layer or an LLC layer of the benefited UE.

For example, by using an LTE system as an example, the maximum number of the first short range bearer identifiers does not exceed 16, and generally is less than 8; therefore, the first short range bearer identifier (for example, 8 first short range bearer identifiers) may be directly defined in the Ether type field to correspond to different short range bearers.

This manner has an advantage of avoiding definition of a new protocol layer.

Manner 2: The first short range bearer identifier is included in a protocol layer indicated by an Ether type field of a MAC layer or an LLC layer of the benefited UE.

The protocol layer herein is a newly defined protocol layer, and the protocol layer is indicated by the Ether type field.

This manner has advantages of lower latency and high data processing efficiency, but has a disadvantage of greater impact on an existing protocol.

Manner 3: The first short range bearer identifier is included in a protocol layer that is indicated by a field of a network layer or a transport layer indicated by an Ether type field of a MAC layer or an LLC layer of the benefited UE.

The protocol layer herein is also a newly defined protocol layer, the Ether type field indicates the field of the network layer or transport layer, and the field of the network layer or transport layer indicates the newly defined protocol layer.

Mainly in this manner, the protocol layer is defined above a higher layer of a protocol stack, which has an advantage of small impact on an existing protocol, but has disadvantages of higher latency, low data processing efficiency, and dependence on an operating system of the higher layer.

It should be noted that, if the Ether type field is included in the MAC layer, the LLC layer may not be required.

In addition, the benefited UE sends the first short range bearer identifier to the supporting UE; in this way, when the supporting UE sends data to the benefited UE, the data may carry the first short range bearer identifier, so that the benefited UE can identify, according to the first short range bearer identifier, a short range bearer corresponding to the data and perform processing.

Optionally, the benefited UE establishes a mapping between the short range bearer and a first radio sub-bearer. The first radio sub-bearer is a bearer in a one-to-one correspondence to the second radio bearer in the first radio bearer.

Further, before the benefited UE establishes the mapping between the short range bearer and the first radio sub-bearer, the benefited UE sets up the first radio sub-bearer, where the number of the first radio sub-bearers is the same as the number of the supporting UEs.

S704: The benefited UE sends a second connection request message to a base station.

S705: The base station configures a second radio bearer according to second benefited bearer information in the second connection request message.

S706: The base station sends a second reconfiguration message to the supporting UE.

S707: The supporting UE sets up the second radio bearer and establishes a mapping between the short range bearer and the second radio bearer according to the second reconfiguration message.

Specifically, the supporting UE acquires, from the base station, a second radio bearer identifier and a second short range bearer identifier that are configured by the base station. The second short range bearer identifier corresponds to the short range bearer on a supporting UE side, and the second radio bearer identifier corresponds to the second radio bearer; and then the supporting UE establishes the mapping between the short range bearer and the second radio bearer by using a mapping between the second short range bearer identifier and the second radio bearer identifier.

Similarly, the second short range bearer identifier correspondingly includes the following three manners:

Manner 1: The second short range bearer identifier is included in an Ether type field of a MAC layer or an LLC layer of the assisting UE.

Manner 2: The second short range bearer identifier is included in a protocol layer indicated by an Ether type field of a MAC layer or an LLC layer of the assisting UE.

Manner 3: The second short range bearer identifier is included in a protocol layer that is indicated by a field of a network layer or a transport layer indicated by an Ether type field of a MAC layer or an LLC layer of the assisting UE.

For specific descriptions, refer to the foregoing descriptions of the first short range bearer identifier, and details are not described herein again.

In addition, the supporting UE sends the second short range bearer identifier to the benefited UE; in this way, when the benefited UE sends data to the supporting UE, the data may carry the second short range bearer identifier, so that the supporting UE can identify, according to the second short range bearer identifier, a short range bearer corresponding to the data and perform processing.

S708: The supporting UE sends a setup complete message to the base station.

S709: The base station performs data receiving and sending by using a mapping between the first radio bearer and the second radio bearer, the benefited UE performs data receiving and sending by using the mapping between the first radio bearer and the short range bearer, and the supporting UE performs data receiving and sending by using the mapping between the second radio bearer and the short range bearer.

Further, when a preset condition is satisfied, the benefited UE or the supporting UE sends a release request message to the base station, and after the base station receives the release request message, the supporting UE receives a release message sent by the base station; or the benefited UE sends a release request message to the base station, and after the base station receives the release request message, the supporting UE and the benefited UE receive a release message sent by the base station.

For example, when a distance between the supporting UE and the benefited UE exceeds a preset distance, the base station receives a release request message sent by the supporting UE or the benefited UE, and sends a release message to the supporting UE according to the release request message, so that the supporting UE releases the corresponding second radio bearer, and the mapping relationship between the second radio bearer and the short range bearer. The preset distance may be set according to an actual application or an empirical value. The base station deletes the second radio bearer of the supporting UE and a mapping between the second radio bearer and a first short range bearer, and the base station deletes a mapping between the first radio bearer of the benefited UE and the first short range bearer.

Specifically, the supporting UE may delete the short range bearer according to the release message, and deletion of the short range bearer may also lead to deletion of the second radio bearer. Certainly, the base station may also send a reconfiguration message to the benefited UE, so that the benefited UE deletes the mapping relationship between the first radio bearer or sub-bearer and the first short range bearer. Specifically, the short range bearer between the benefited UE and the supporting UE may also be deleted. If all short range bearers between the benefited UE and the supporting UE are deleted, correspondingly, a short range connection between the benefited UE and the supporting UE is also deleted.

For another example, when the first radio bearer of the benefited UE is deleted because the benefited UE cancels a corresponding service, the base station receives a release request message sent by the benefited UE, and sends a release message to the supporting UE and the benefited UE according to the release request message. The base station deletes the second radio bearer of the supporting UE and the mapping between the second radio bearer and the first short range bearer, and the base station deletes the mapping between the first radio bearer of the benefited UE and the first short range bearer.

Specifically, the supporting UE or the benefited UE (the supporting UE or the benefited UE may be configured according to an actual application) may delete the short range bearer according to the release message, and deletion of the short range bearer may also lead to deletion of the second radio bearer and the first radio sub-bearer. In addition, if all short range bearers are deleted, correspondingly, a short range connection is deleted.

It should be noted that, if the benefited UE is switched to an idle state (for example, there is no service interaction), the supporting UE may also be switched to the idle state; in this case, the short range bearer is maintained. In this way, when the benefited UE and the supporting UE are switched to an active state (for example, the benefited UE initiates service interaction), no short range bearer needs to be set up again, thereby simplifying an information interaction process, and improving user experience.

In addition, if the short range bearer is unavailable, a short range connection, of the supporting UE, corresponding to the short range bearer is deleted.

If a new supporting UE is added, a short range bearer is set up for the new supporting UE.

Further, when the benefited UE is switched from the idle state to the active state, the supporting UE is also switched to the active state, and then step S602 to step S611 are triggered.

In addition, the short range connection between the supporting UE and the benefited UE may be a short range communications technology such as WiFi, Bluetooth (Blue Tooth), or Zigbee, and may even be a wired network such as Ethernet, and in this case, the short range bearer between the benefited UE and the supporting UE is a bearer implemented by using a wired connection.

By using the foregoing steps, one-to-one mappings are formed between bearers, so that a UE can distinguish, on a short range link, a radio bearer corresponding to transmission of data information and perform corresponding processing.

It should be noted that, for ease of description, the foregoing method embodiments are described as a series of action combinations. However, a person skilled in the art should understand that the present invention is not limited to the described sequence of the actions, because some steps may be performed in another sequence or performed at the same time according to the present invention. In addition, a person skilled in the art should also understand that all the embodiments described in this specification belong to exemplary embodiments, and the involved actions and modules are not necessarily mandatory to the present invention.

Figure 8:
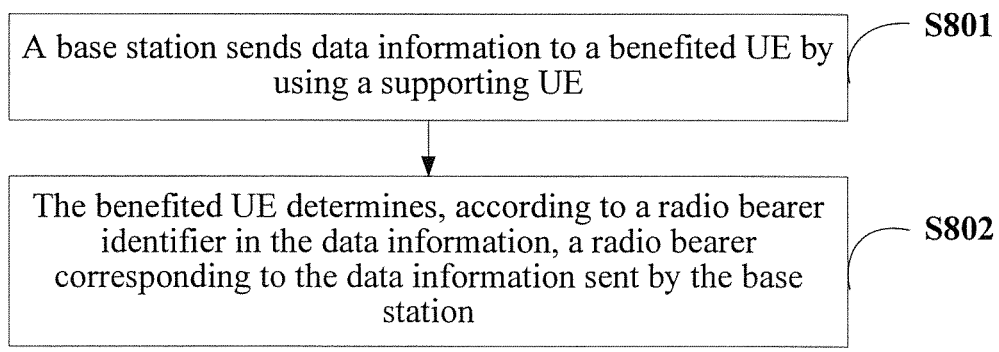
FIG. 8 is a schematic diagram of another short range communications method according to an embodiment of the present invention.

An embodiment of the present invention provides a short range communications method. As shown in FIG. 8, the method embodiment is described by using downlink data transmission as an example and a UE in the method embodiment uses a benefited UE as an example. The method includes:

S801: A base station sends data information to a benefited UE by using a supporting UE.

The data information carries a radio bearer identifier configured in the base station, where the radio bearer identifier corresponds to a radio bearer set up by the UE.

S802: The benefited UE determines, according to a radio bearer identifier in the data information, a radio bearer corresponding to the data information sent by the base station.

The radio bearer identifier is included in a PDCP layer of the base station, or a protocol layer above the PDCP layer, or a protocol layer between the PDCP layer and an RLC layer, or the RLC layer, or a protocol layer between the RLC layer and a MAC layer, or the MAC layer, or a protocol layer between the MAC layer and a PHY layer, or the PHY layer.

In this way, a base station adds a radio bearer identifier to data information, so that when receiving the data information, a UE determines, according to the radio bearer identifier, a radio bearer corresponding to transmission of the data information, and then the UE can distinguish, on a short range link, a radio bearer corresponding to transmission of data information and perform corresponding processing.

It should be noted that words such as first and second used for description in the foregoing embodiments are not intended to impose a sequence limit, but are only for convenience of differentiation.

Figure 9:
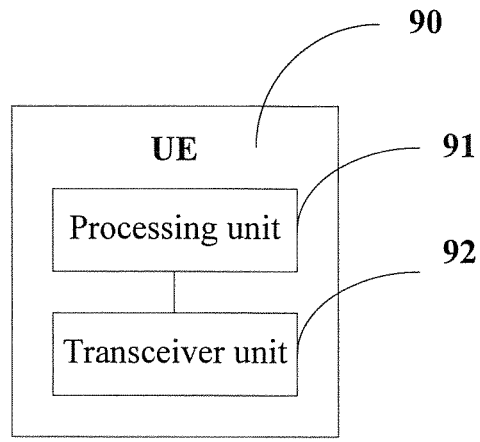
FIG. 9 is a schematic structural diagram of a UE according to an embodiment of the present invention.

An embodiment of the present invention provides a UE 90. As shown in FIG. 9, the UE includes:

a processing unit 91, configured to establish a mapping between a short range bearer and a first radio bearer, where the first radio bearer is a benefited radio bearer of a benefited UE; the short range bearer is a bearer set up to assist a supporting UE in communication with the benefited UE; a mapping is performed between the short range bearer and a second radio bearer on a supporting UE side; and the second radio bearer is a radio bearer set up for the supporting UE to assist the first radio bearer, and a mapping is performed between the first radio bearer and the second radio bearer on a base station side; and it should be noted that the mapping between the short range bearer and the second radio bearer on the supporting UE side may be established by the supporting UE, and specifically, the supporting UE receives a second reconfiguration message sent by a base station, and establishes the mapping between the short range bearer and the second radio bearer according to the second reconfiguration message; and a transceiver unit 92, configured to perform data receiving and sending by using the mapping established by the processing unit 91 between the first radio bearer and the short range bearer.

Optionally, the transceiver unit 92 is further configured to: before the processing unit 91 establishes the mapping between the short range bearer and the first radio bearer, receive a first reconfiguration message sent by the base station; and the processing unit 91 is further configured to set up the first radio bearer according to the first reconfiguration message, and establish the mapping between the short range bearer and the first radio bearer according to the first reconfiguration message received by the transceiver unit.

Optionally, the transceiver unit 92 is further configured to: before the processing unit 91 establishes the mapping between the short range bearer and the first radio bearer, receive a bearer setup message sent by the base station;

the processing unit 91 is further configured to set up the first radio bearer according to the bearer setup message;

the transceiver unit 92 is further configured to receive a first reconfiguration message sent by the base station; and the processing unit 91 is specifically configured to establish the mapping between the short range bearer and the first radio bearer according to the first reconfiguration message received by the transceiver unit 92.

Optionally, the processing unit 91 is further configured to: after the transceiver unit 92 receives the first reconfiguration message sent by the base station, set up the short range bearer according to first short range bearer configuration information in the first reconfiguration message.

Specifically, the first short range bearer configuration information includes short range information (such as a frequency channel number) of the supporting UE.

It should be noted that the short range bearer may also be set up by the supporting UE according to second short range bearer configuration information in the second reconfiguration message after the supporting UE receives the second reconfiguration message sent by the base station. The second short range bearer configuration information includes short range information (such as a frequency channel number) of the benefited UE.

Optionally, the transceiver unit 92 is further configured to acquire a first short range bearer identifier and a first radio bearer identifier that are configured by the base station, where the first short range bearer identifier corresponds to the short range bearer, and the first radio bearer identifier corresponds to the first radio bearer; and the processing unit 91 is specifically configured to establish the mapping between the short range bearer and the first radio bearer by using a mapping between the first short range bearer identifier and the first radio bearer identifier.

Optionally, the transceiver unit 92 is further configured to send the first short range bearer identifier to the supporting UE, so that when sending data to the benefited UE, the supporting UE adds the first short range bearer identifier to the data.

Specifically, when the supporting UE sends data to the benefited UE, the data may carry the first short range bearer identifier, so that the benefited UE can identify, according to the first short range bearer identifier, a short range bearer corresponding to the data and perform processing.

Optionally, the processing unit 91 is specifically configured to establish a mapping between a short range bearer and a first radio sub-bearer.

The first radio sub-bearer is a bearer in a one-to-one correspondence to the second radio bearer in the first radio bearer.

Optionally, the processing unit 91 is further configured to: before establishing the mapping between the short range bearer and the first radio sub-bearer, set up the first radio sub-bearer, where the number of the first radio sub-bearers is the same as the number of the supporting UEs.

Optionally, the transceiver unit 92 is further configured to send a second connection request message to the base station, so that the base station configures the second radio bearer according to second benefited bearer information in the second connection request message.

The second benefited bearer information includes an identifier of the supporting UE, the first radio bearer identifier, and the first short range bearer identifier and/or a second short range bearer identifier, where the second short range bearer identifier is an identifier corresponding to the short range bearer on the supporting UE side.

It should be noted that configuration of the second radio bearer may also be that: the supporting UE sends a first connection request message to the base station, so that the base station correspondingly configures the second radio bearer according to first benefited bearer information in the first connection request message.

The first benefited bearer information includes an identifier of the benefited UE, the first radio bearer identifier (or a first radio sub-bearer identifier), and the first short range bearer identifier and/or the second short range bearer identifier.

The following describes that the benefited UE and the supporting UE distinguish the short range bearer by using the first short range bearer identifier.

The short range bearer is distinguished by using the first short range bearer identifier mainly in the following three manners:

Manner 1: The first short range bearer identifier is included in an Ether type field of a MAC layer or an LLC layer of the benefited UE.

For example, by using an LTE system as an example, the maximum number of the first short range bearer identifiers does not exceed 16, and generally is less than 8; therefore, the first short range bearer identifier (for example, 8 first short range bearer identifiers) may be directly defined in the Ether type field to correspond to different short range bearers.

This manner has an advantage of avoiding definition of a new protocol layer.

Manner 2: The first short range bearer identifier is included in a protocol layer indicated by an Ether type field of a MAC layer or an LLC layer of the benefited UE.

The protocol layer herein is a newly defined protocol layer, and the protocol layer is indicated by the Ether type field.

This manner has advantages of lower latency and high data processing efficiency, but has a disadvantage of greater impact on an existing protocol.

Manner 3: The first short range bearer identifier is included in a protocol layer indicated by a field of a network layer or transport layer of the benefited UE.

The protocol layer herein is also a newly defined protocol layer, the Ether type field indicates the field of the network layer or transport layer, and the field of the network layer or transport layer indicates the newly defined protocol layer.

Mainly in this manner, the protocol layer is defined above a higher layer of a protocol stack, which has an advantage of small impact on an existing protocol, but has disadvantages of higher latency, low data processing efficiency, and dependence on an operating system of the higher layer.

In addition, if the Ether type field is included in the MAC layer, the LLC layer may not be required.

It should be noted that the short range connection between the supporting UE and the benefited UE may be a short range communications technology such as WiFi, Bluetooth (Blue Tooth), or Zigbee, and may even be a wired network such as Ethernet, and in this case, the short range bearer between the benefited UE and the supporting UE is a bearer implemented by using a wired connection. The UE may be the benefited UE.

By using the UE, a mapping relationship exists between a first radio bearer and a short range bearer, a mapping relationship exists between a second radio bearer and the short range bearer, and meanwhile, a mapping relationship exists between the first radio bearer and the second radio bearer; in this way, one-to-one mappings are formed between the bearers, so that the UE can distinguish, on a short range link, a radio bearer corresponding to transmission of data information and perform further processing.

A person skilled in the art may clearly understand that, for the purpose of convenient and brief description, for a detailed working process and description of the UE described above, reference may be made to the corresponding process in the method embodiment described with respect to FIG. 1, and details are not described herein again.

Figure 10:
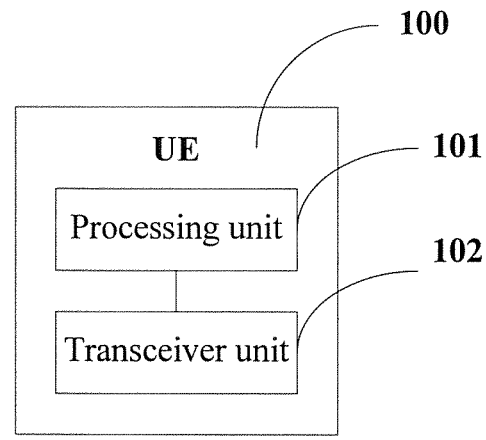
FIG. 10 is a schematic structural diagram of a UE according to an embodiment of the present invention.

An embodiment of the present invention provides a UE 100. As shown in FIG. 10, the UE includes:

a processing unit 101, configured to establish a mapping between a short range bearer and a second radio bearer, where the second radio bearer is a radio bearer set up for a supporting UE to assist a first radio bearer; the short range bearer is a bearer set up to assist the supporting UE in communication with a benefited UE; the first radio bearer is a benefited radio bearer of the benefited UE; and a mapping is performed between the first radio bearer and the second radio bearer on a base station side; and it should be noted that a mapping between the short range bearer and the first radio bearer on a benefited UE side may be established by the benefited UE, and specifically, the benefited UE receives a first reconfiguration message sent by a base station, and establishes the mapping between the short range bearer and the first radio bearer according to the first reconfiguration message; and a transceiver unit 102, configured to perform data receiving and sending by using the mapping established by the processing unit 101 between the second radio bearer and the short range bearer.

Optionally, the transceiver unit 102 is configured to receive a second reconfiguration message sent by the base station;

the processing unit 101 is further configured to set up the second radio bearer according to the second reconfiguration message received by the transceiver unit 102; and the processing unit 101 is specifically configured to establish the mapping between the short range bearer and the second radio bearer according to the second reconfiguration message received by the transceiver unit 102.

Optionally, the transceiver unit 102 is further configured to receive a bearer setup message sent by the base station;

the processing unit 101 is further configured to set up the second radio bearer according to the bearer setup message received by the transceiver unit 102;

the transceiver unit 102 is further configured to receive a second reconfiguration message sent by the base station; and the processing unit 101 is specifically configured to establish the mapping between the short range bearer and the second radio bearer according to the second reconfiguration message received by the transceiver unit 102.

Optionally, the processing unit 101 is further configured to: after the transceiver unit 102 receives the second reconfiguration message sent by the base station, set up the short range bearer according to second short range bearer configuration information in the second reconfiguration message.

Specifically, the second short range bearer configuration information includes short range information (such as a frequency channel number) of the supporting UE.

It should be noted that the short range bearer may also be set up by the benefited UE according to first short range bearer configuration information in the first reconfiguration message, and specifically, the first short range bearer configuration information includes short range information (such a frequency channel number) of the supporting UE.

Optionally, the transceiver unit 102 is further configured to acquire a second short range bearer identifier and a second radio bearer identifier that are configured by the base station, where the second short range bearer identifier corresponds to the short range bearer, and the second radio bearer identifier corresponds to the second radio bearer; and the processing unit 101 is specifically configured to establish the mapping between the short range bearer and the second radio bearer by using a mapping between the second short range bearer identifier and the second radio bearer identifier.

Optionally, the transceiver unit 102 is further configured to send the second short range bearer identifier to the benefited UE, so that when sending data to the supporting UE, the benefited UE adds the second short range bearer identifier to the data.

Specifically, when the benefited UE sends data to the supporting UE, the data may carry the second short range bearer identifier, so that the benefited UE can identify, according to the second short range bearer identifier, a short range bearer corresponding to the data and perform processing.

Optionally, the transceiver unit 102 is further configured to send a first connection request message to the base station, so that the base station correspondingly configures the second radio bearer according to first benefited bearer information in the first connection request message.

The first benefited bearer information includes an identifier of the benefited UE, a first radio bearer identifier, and a first short range bearer identifier and/or the second short range bearer identifier, where the first short range bearer identifier is an identifier corresponding to the short range bearer on the benefited UE side.

The following describes that the benefited UE and the supporting UE distinguish the short range bearer by using the second short range bearer identifier.

The short range bearer is distinguished by using the second short range bearer identifier mainly in the following three manners:

Manner 1: The second short range bearer identifier is included in an Ether type field of a Media Access Control layer MAC layer or a Logical Link Control LLC layer of the supporting UE.

For example, by using an LTE system as an example, the maximum number of the first short range bearer identifiers does not exceed 16, and generally is less than 8; therefore, the second short range bearer identifier (for example, 8 second short range bearer identifiers) may be directly defined in the Ether type field to correspond to different short range bearers.

This manner has an advantage of avoiding definition of a new protocol layer.

Manner 2: The second short range bearer identifier is included in a protocol layer indicated by an Ether type field of a MAC layer or an LLC layer of the supporting UE.

The protocol layer herein is a newly defined protocol layer, and the protocol layer is indicated by the Ether type field.

This manner has advantages of lower latency and high data processing efficiency, but has a disadvantage of greater impact on an existing protocol.

Manner 3: The second short range bearer identifier is included in a protocol layer that is indicated by a field of a network layer or a transport layer indicated by an Ether type field of a MAC layer or an LLC layer of the supporting UE.

The protocol layer herein is also a newly defined protocol layer, the Ether type field indicates the field of the network layer or transport layer, and the field of the network layer or transport layer indicates the newly defined protocol layer.

Mainly in this manner, the protocol layer is defined above a higher layer of a protocol stack, which has an advantage of small impact on an existing protocol, but has disadvantages of higher latency, low data processing efficiency, and dependence on an operating system of the higher layer.

In addition, if the Ether type field is included in the MAC layer, the LLC layer may not be required.

It should be noted that the short range connection between the supporting UE and the benefited UE may be a short range communications technology such as WiFi, Bluetooth (Blue Tooth), or Zigbee, and may even be a wired network such as Ethernet, and in this case, the short range bearer between the benefited UE and the supporting UE is a bearer implemented by using a wired connection. The UE may be the supporting UE.

By using the UE, a mapping relationship exists between a first radio bearer and a short range bearer, a mapping relationship exists between a second radio bearer and the short range bearer, and meanwhile, a mapping relationship exists between the first radio bearer and the second radio bearer; in this way, one-to-one mappings are formed between the bearers, so that the UE can distinguish, on a short range link, a radio bearer corresponding to transmission of data information and perform further processing.

A person skilled in the art may clearly understand that, for the purpose of convenient and brief description, for a detailed working process and description of the UE described above, reference may be made to the corresponding process in the method embodiment described with respect to FIG. 2, and details are not described herein again.

Figure 11:
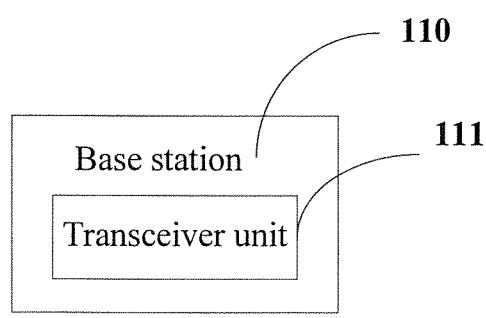
FIG. 11 is a schematic structural diagram of a base station according to an embodiment of the present invention.

An embodiment of the present invention provides a base station 110. As shown in FIG. 11, the base station includes:

a transceiver unit 111, configured to send a second reconfiguration message to a supporting UE, so that the supporting UE establishes a mapping between a short range bearer and a second radio bearer according to the second reconfiguration Message, and performs data receiving and sending by using the mapping between the second radio bearer and the short range bearer.

The second radio bearer is a radio bearer set up for the supporting UE to assist a first radio bearer; the short range bearer is a bearer set up to assist the supporting UE in communication with a benefited UE; the first radio bearer is a benefited radio bearer of the benefited UE, and a mapping is performed between the first radio bearer and the short range bearer on a benefited UE side; and a mapping is performed between the first radio bearer and the second radio bearer on a base station side.

The transceiver unit 111 is further configured to perform data sending or receiving by using the mapping between the first radio bearer and the second radio bearer.

Optionally, the transceiver unit 111 is further configured to send a first reconfiguration message to the benefited UE, so that the benefited UE establishes the mapping between the short range bearer and the first radio bearer according to the first reconfiguration message, and performs data receiving and sending by using the mapping between the first radio bearer and the short range bearer.

Optionally, the transceiver unit 111 is specifically configured to send first short range bearer configuration information to the benefited UE, so that the benefited UE sets up the short range bearer according to the first short range bearer configuration information.

The transceiver unit 111 is specifically configured to send second short range bearer configuration information to the supporting UE, so that the benefited UE sets up the short range bearer according to the second short range bearer configuration information.

Figure 12:
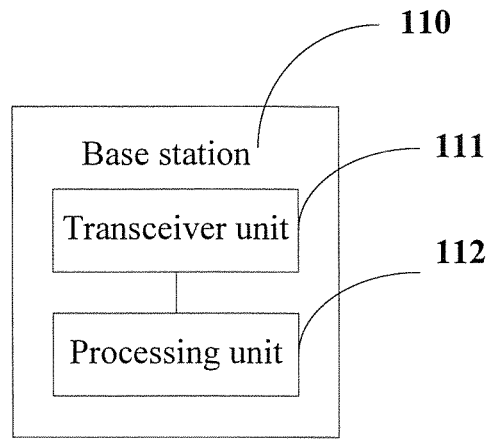
FIG. 12 is a schematic structural diagram of another base station according to an embodiment of the present invention.

Further, as shown in FIG. 12, the base station 110 further includes:

a processing unit 112, configured to configure a first short range bearer identifier and a first radio bearer identifier, where the first short range bearer identifier corresponds to the short range bearer, and the first radio bearer identifier corresponds to the first radio bearer; and the transceiver unit 111 is further configured to send the first short range bearer identifier and the first radio bearer identifier that are configured by the processing unit 112 to the benefited UE, so that the benefited UE establishes the mapping between the short range bearer and the first radio bearer according to the first short range bearer identifier and the first radio bearer identifier.

The processing unit 112 is further configured to configure a second short range bearer identifier and a second radio bearer identifier, where the second short range bearer identifier corresponds to the short range bearer, and the second radio bearer identifier corresponds to the second radio bearer; and the transceiver unit is further configured to send the second short range bearer identifier and the second radio bearer identifier that are configured by the processing unit to the supporting UE, so that the supporting UE establishes the mapping between the short range bearer and the second radio bearer according to the second short range bearer identifier and the second radio bearer identifier.

Optionally, the transceiver unit 111 is further configured to send the first reconfiguration message to the benefited UE, so that the benefited UE establishes a mapping between the short range bearer and a first radio sub-bearer according to the first reconfiguration message, where the first radio sub-bearer is a bearer in a one-to-one correspondence to the second radio bearer in the first radio bearer.

Optionally, the transceiver unit 111 is further configured to: before sending the second reconfiguration message to the supporting UE, receive a first connection request message sent by the supporting UE.

The processing unit 112 is further configured to correspondingly configure the second radio bearer according to first benefited bearer information in the first connection request message received by the transceiver unit 111, where the first benefited bearer information includes: an identifier of the benefited UE, the first radio bearer identifier, and the first short range bearer identifier and/or the second short range bearer identifier.

The transceiver unit 111 is further configured to: before sending the second reconfiguration message to the supporting UE, receive a second connection request message sent by the benefited UE.

The processing unit 112 is further configured to correspondingly configure the second radio bearer according to second benefited bearer information in the second connection request message received by the transceiver unit 111.

The second benefited bearer infatuation includes: an identifier of the supporting UE, the first radio bearer identifier, and the first short range bearer identifier and/or the second short range bearer identifier.

The short range bearer is distinguished by using the first short range bearer identifier mainly in the following three manners:

Manner 1: The first short range bearer identifier is included in an Ether type field of a MAC layer or an LLC layer of the benefited UE.

For example, by using an LTE system as an example, the maximum number of the first short range bearer identifiers does not exceed 16, and generally is less than 8; therefore, the first short range bearer identifier (for example, 8 first short range bearer identifiers) may be directly defined in the Ether type field to correspond to different short range bearers.

This manner has an advantage of avoiding definition of a new protocol layer.

Manner 2: The first short range bearer identifier is included in a protocol layer indicated by an Ether type field of a MAC layer or an LLC layer of the benefited UE.

The protocol layer herein is a newly defined protocol layer, and the protocol layer is indicated by the Ether type field.

This manner has advantages of lower latency and high data processing efficiency, but has a disadvantage of greater impact on an existing protocol.

Manner 3: The first short range bearer identifier is included in a protocol layer indicated by a field of a network layer or transport layer of the benefited UE.

The protocol layer herein is also a newly defined protocol layer, the Ether type field indicates the field of the network layer or transport layer, and the field of the network layer or transport layer indicates the newly defined protocol layer.

Mainly in this manner, the protocol layer is defined above a higher layer of a protocol stack, which has an advantage of small impact on an existing protocol, but has disadvantages of higher latency, low data processing efficiency, and dependence on an operating system of the higher layer.

Similarly, the second short range bearer identifier correspondingly includes the following three manners:

Manner 1: The second short range bearer identifier is included in an Ether type field of a MAC layer or an LLC layer of the supporting UE.

Manner 2: The second short range bearer identifier is included in a protocol layer indicated by an Ether type field of a MAC layer or an LLC layer of the supporting UE.

Manner 3: The second short range bearer identifier is included in a protocol layer that is indicated by a field of a network layer or a transport layer indicated by an Ether type field of a MAC layer or an LLC layer of the supporting UE.

For specific descriptions, refer to the foregoing descriptions of the first short range bearer identifier, and details are not described herein again.

In addition, if the Ether type field is included in the MAC layer, the LLC layer may not be required.

By using the base station, a mapping relationship exists between a first radio bearer and a short range bearer, a mapping relationship exists between a second radio bearer and the short range bearer, and meanwhile, a mapping relationship exists between the first radio bearer and the second radio bearer; in this way, one-to-one mappings are formed between the bearers, so that a UE can distinguish, on a short range link, a radio bearer corresponding to transmission of data information and perform further processing.

A person skilled in the art may clearly understand that, for the purpose of convenient and brief description, for a detailed working process and description of the base station described above, reference may be made to the corresponding process in the method embodiment described with respect to FIG. 3, and details are not described herein again.

Figure 13:
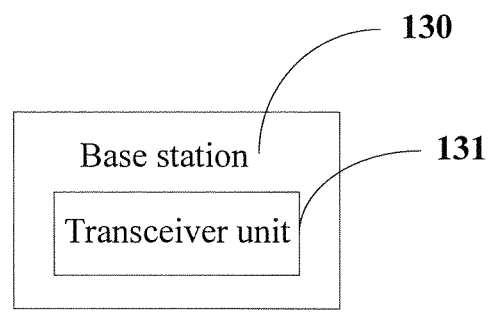
FIG. 13 is a schematic structural diagram of a base station according to an embodiment of the present invention.

An embodiment of the present invention provides a base station 130. As shown in FIG. 13, the base station includes:

a transceiver unit 131, configured to send a first reconfiguration message to a benefited UE, so that the benefited UE establishes a mapping between a short range bearer and a first radio bearer according to the first reconfiguration message, and performs data receiving and sending by using the mapping between the first radio bearer and the short range bearer.

The first radio bearer is a benefited radio bearer of the benefited UE; the short range bearer is a bearer set up to assist a supporting UE in communication with the benefited UE; a mapping is performed between the short range bearer and a second radio bearer on a supporting UE side; the second radio bearer is a radio bearer set up for the supporting UE to assist the first radio bearer; and a mapping is performed between the first radio bearer and the second radio bearer on a base station side.

The transceiver unit 131 is further configured to perform data sending or receiving by using the mapping between the first radio bearer and the second radio bearer.

By using the base station provided in this embodiment of the present invention, a mapping relationship exists between a first radio bearer and a short range bearer, a mapping relationship exists between a second radio bearer and the short range bearer, and meanwhile, a mapping relationship exists between the first radio bearer and the second radio bearer; in this way, one-to-one mappings are formed between the bearers, so that a UE can distinguish, on a short range link, a radio bearer corresponding to transmission of data information and perform further processing.

A person skilled in the art may clearly understand that, for the purpose of convenient and brief description, for a detailed working process and description of the base station described above, reference may be made to the corresponding process in the method embodiment described with respect to FIG. 4, and details are not described herein again.

Figure 14:
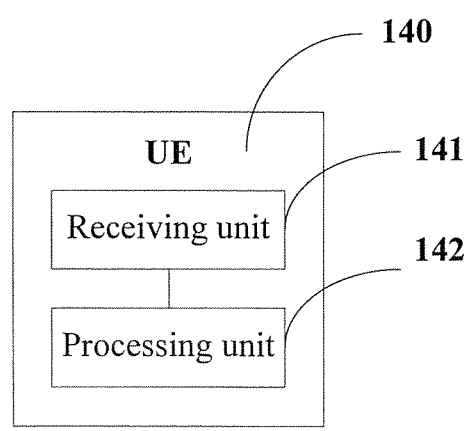
FIG. 14 is a schematic structural diagram of a UE according to an embodiment of the present invention.

An embodiment of the present invention provides a UE 140. As shown in FIG. 14, the UE includes:

a receiving unit 141, configured to receive data information sent by a base station, where the data information carries a radio bearer identifier configured in the base station, where the radio bearer identifier corresponds to a radio bearer set up by the UE; and a processing unit 142, configured to determine, according to the radio bearer identifier received by the receiving unit 141, a radio bearer corresponding to the data information sent by the base station.

Further, the radio bearer identifier is included in a Packet Data Convergence Protocol PDCP layer of the base station, or a protocol layer above the PDCP layer, or a protocol layer between the PDCP layer and a Radio Link Control RLC layer, or the RLC layer, or a protocol layer between the RLC layer and a MAC layer, or the MAC layer, or a protocol layer between the MAC layer and a PHY layer, or the PHY layer.

It should be noted that the UE may be a benefited UE.

By using the UE, a base station adds a radio bearer identifier to data information, so that when receiving the data information, the UE determines, according to the radio bearer identifier, a radio bearer corresponding to transmission of the data information, and then the UE can distinguish, on a short range link, a radio bearer corresponding to transmission of data information and perform corresponding processing.

A person skilled in the art may clearly understand that, for the purpose of convenient and brief description, for a detailed working process and description of the UE described above, reference may be made to the corresponding process in the method embodiment described with respect to FIG. 5, and details are not described herein again.

Figure 15:
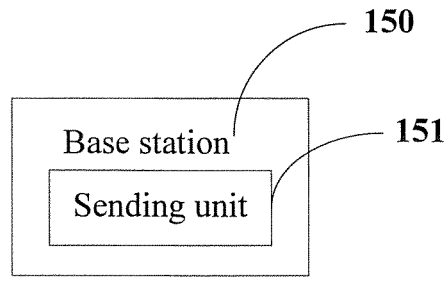
FIG. 15 is a schematic structural diagram of a base station according to an embodiment of the present invention.

An embodiment of the present invention provides a base station 150. As shown in FIG. 15, the base station includes:

a sending unit 151, configured to send data information to a UE, so that the UE determines, according to a radio bearer identifier, a radio bearer corresponding to the data information sent by the base station, where the data information carries the radio bearer identifier configured in the base station, and the radio bearer identifier corresponds to a radio bearer set up by the UE.

Further, the radio bearer identifier is included in a Packet Data Convergence Protocol PDCP layer of the base station, or a protocol layer above the PDCP layer, or a protocol layer between the PDCP layer and a Radio Link Control RLC layer, or the RLC layer, or a protocol layer between the RLC layer and a MAC layer, or the MAC layer, or a protocol layer between the MAC layer and a PHY layer, or the PHY layer.

By using the base station, the base station adds a radio bearer identifier to data information, so that when receiving the data information, a UE determines, according to the radio bearer identifier, a radio bearer corresponding to transmission of the data information, and then the UE can distinguish, on a short range link, a radio bearer corresponding to transmission of data information and perform corresponding processing.

A person skilled in the art may clearly understand that, for the purpose of convenient and brief description, for a detailed working process and description of the base station described above, reference may be made to the corresponding process in the method embodiment described with respect to FIG. 8, and details are not described herein again.

Figure 16:
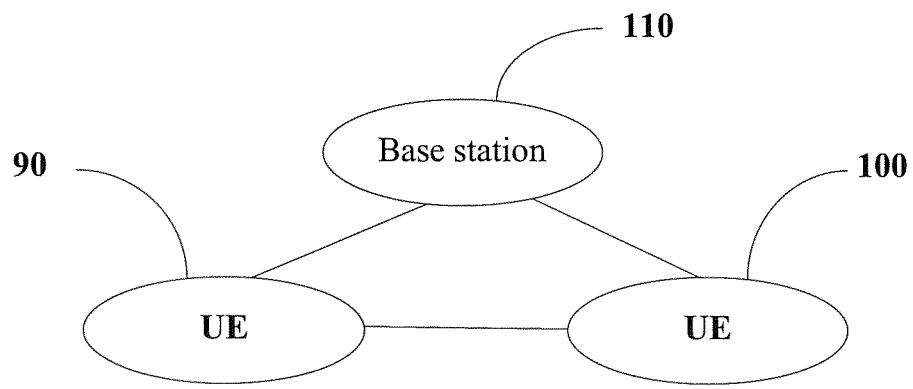
FIG. 16 is a schematic diagram of a short range communications system according to an embodiment of the present invention.

An embodiment of the present invention provides a short range communications system. As shown in FIG. 16, the system includes: the UE 90 described in FIG. 9, the UE 100 described in FIG. 10, and the base station 110 described in FIG. 11 or FIG. 12.

It should be noted that the UE described in FIG. 9 is applied to the short range communications method described in FIG. 1, and each unit in the UE also corresponds to each step in the method; the UE described in FIG. 10 is applied to the short range communications method described in FIG. 2, and each unit in the UE also corresponds to each step in the method; the base station described in FIG. 11 or FIG. 12 is applied to the short range communications method described in FIG. 3, and each unit in the base station also corresponds to each step in the method.

By using the system, a mapping relationship exists between a first radio bearer and a short range bearer, a mapping relationship exists between a second radio bearer and the short range bearer, and meanwhile, a mapping relationship exists between the first radio bearer and the second radio bearer; in this way, one-to-one mappings are formed between the bearers, so that a UE can distinguish, on a short range link, a radio bearer corresponding to transmission of data information and perform further processing.

Figure 17:
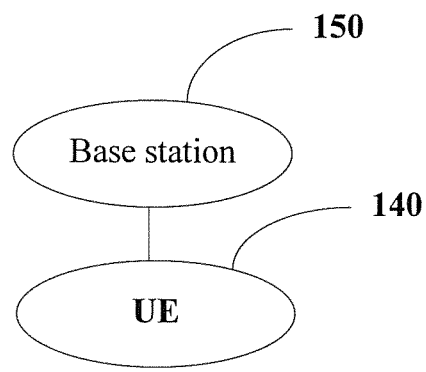
FIG. 17 is a schematic diagram of a short range communications system according to an embodiment of the present invention.

An embodiment of the present invention provides a short range communications system. As shown in FIG. 17, the short range communications system includes:

the UE 140 described in FIG. 14 and the base station 150 described in FIG. 15.

It should be noted that the UE described in FIG. 14 is applied to the short range communications method described in FIG. 5, and each unit in the UE also corresponds to each step in the method; the base station described in FIG. 15 is applied to the short range communications method described in FIG. 8, and each unit in the base station also corresponds to each step in the method.

By using the system, a base station adds a radio bearer identifier to data information, so that when receiving the data information, a UE determines, according to the radio bearer identifier, a radio bearer corresponding to transmission of the data information, and then the UE can distinguish, on a short range link, a radio bearer corresponding to transmission of data information and perform corresponding processing.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A short range communications method, comprising:
   sending, by a base station, a second reconfiguration message to a supporting UE for establishing a mapping between a short range bearer and a second radio bearer according to the second reconfiguration message;

performing data receiving and sending by using the mapping between the second radio bearer and the short range bearer, wherein the second radio bearer is a radio bearer set up for the supporting UE to assist a first radio bearer, the short range bearer is a bearer set up to assist the supporting UE in communication with a benefited UE, the first radio bearer is a benefited radio bearer of the benefited UE, a mapping is performed between the first radio bearer and the short range bearer on a benefited UE side, and a mapping is performed between the first radio bearer and the second radio bearer on a base station side; and performing, by the base station, data sending or receiving by using the mapping between the first radio bearer and the second radio bearer.

2. The method according to claim 1, further comprising:
sending, by the base station, a first reconfiguration message to the benefited UE for establishing the mapping between the short range bearer and the first radio bearer according to the first reconfiguration message, and performing data receiving and sending by using the mapping between the first radio bearer and the short range bearer.

3. The method according to claim 2, wherein:
sending, by the base station, a first reconfiguration message to the benefited UE comprises:
sending, by the base station, first short range bearer configuration information to the benefited UE for setting up the short range bearer according to the first short range bearer configuration information; or
sending, by a base station, a second reconfiguration message to a supporting UE comprises:
sending, by the base station, second short range bearer configuration information to the supporting UE for setting up the short range bearer according to the second short range bearer configuration information.

4. The method according to claim 3, further comprising:
configuring, by the base station, a first short range bearer identifier and a first radio bearer identifier, and sending them to the benefited UE, wherein the first short range bearer identifier corresponds to the short range bearer, and the first radio bearer identifier corresponds to the first radio bearer for establishing the mapping between the short range bearer and the first radio bearer according to the first short range bearer identifier and the first radio bearer identifier; and
configuring, by the base station, a second short range bearer identifier and a second radio bearer identifier, and sending them to the supporting UE for establishing the mapping between the short range bearer and the second radio bearer according to the second short range bearer identifier and the second radio bearer identifier, wherein the second short range bearer identifier corresponds to the short range bearer, and the second radio bearer identifier corresponds to the second radio bearer.

5. The method according to claim 4, wherein before sending, by a base station, a second reconfiguration message to a supporting UE, the method further comprises:
receiving, by the base station, a first connection request message sent by the supporting UE, and correspondingly configuring the second radio bearer according to first benefited bearer information in the first connection request message, wherein the first benefited bearer information comprises: an identifier of the benefited UE, the first radio bearer identifier, and the first short range bearer identifier and/or the second short range bearer identifier; or
receiving, by the base station, a second connection request message sent by the benefited UE, and correspondingly configuring the second radio bearer according to second benefited bearer information in the second connection request message, wherein the second benefited bearer information comprises: an identifier of the supporting UE, the first radio bearer identifier, and the first short range bearer identifier and/or the second short range bearer identifier.

6. The method according to claim 3, wherein:
the first short range bearer identifier is comprised in:
an Ether type field of a MAC layer or an LLC layer of the benefited UE, or
a protocol layer indicated by an Ether type field of a MAC layer or an LLC layer of the benefited UE, or
a protocol layer that is indicated by a field of a network layer or a transport layer indicated by an Ether type field of a MAC layer or an LLC layer of the benefited UE; and
the second short range bearer identifier is comprised in:
an Ether type field of a MAC layer or an LLC layer of the supporting UE, or
a protocol layer indicated by an Ether type field of a MAC layer or an LLC layer of the supporting UE, or
a protocol layer that is indicated by a field of a network layer or a transport layer indicated by an Ether type field of a MAC layer or an LLC layer of the supporting UE.

7. The method according to claim 1, wherein sending, by the base station, a first reconfiguration message to the benefited UE for establishing the mapping between the short range bearer and the first radio bearer according to the first reconfiguration message comprises:
sending, by the base station, the first reconfiguration message to the benefited UE for establishing a mapping between the short range bearer and a first radio sub-bearer according to the first reconfiguration message, wherein the first radio sub-bearer is a bearer in a one-to-one correspondence to the second radio bearer in the first radio bearer.

8. A short range communications method, comprising:
sending, by a base station, a first reconfiguration message to a benefited UE for establishing a mapping between a short range bearer and a first radio bearer according to the first reconfiguration message;
performing data receiving and sending by using the mapping between the first radio bearer and the short range bearer, wherein the first radio bearer is a benefited radio bearer of the benefited UE, the short range bearer is a bearer set up to assist a supporting UE in communication with the benefited UE, a mapping is performed between the short range bearer and a second radio bearer on a supporting UE side, the second radio bearer is a radio bearer set up for the supporting UE to assist the first radio bearer, and a mapping is performed between the first radio bearer and the second radio bearer on a base station side; and
performing, by the base station, data sending or receiving by using the mapping between the first radio bearer and the second radio bearer.

9. A base station, comprising:
a transceiver, configured to:
send a second reconfiguration message to a supporting UE for establishing a mapping between a short range bearer and a second radio bearer according to the second reconfiguration message;

perform data receiving and sending by using the mapping between the second radio bearer and the short range bearer, wherein the second radio bearer is a radio bearer set up for the supporting UE to assist a first radio bearer, the short range bearer is a bearer set up to assist the supporting UE in communication with a benefited UE, the first radio bearer is a benefited radio bearer of the benefited UE, a mapping is performed between the first radio bearer and the short range bearer on a benefited UE side, and a mapping is performed between the first radio bearer and the second radio bearer on a base station side; and perform data sending or receiving by using the mapping between the first radio bearer and the second radio bearer.

10. The base station according to claim 9, wherein the transceiver is configured to:

send a first reconfiguration message to the benefited UE for establishing the mapping between the short range bearer and the first radio bearer according to the first reconfiguration message; and perform data receiving and sending by using the mapping between the first radio bearer and the short range bearer.

11. The base station according to claim 10, wherein the transceiver is configured to:

send first short range bearer configuration information to the benefited UE for setting up the short range bearer according to the first short range bearer configuration information; and send second short range bearer configuration information to the supporting UE for setting up the short range bearer according to the second short range bearer configuration information.

12. The base station according to claim 11, wherein the base station further comprises:

a processor, configured to:

configure a first short range bearer identifier and a first radio bearer identifier, wherein the first short range bearer identifier corresponds to the short range bearer, and the first radio bearer identifier corresponds to the first radio bearer, wherein the transceiver is configured to send the first short range bearer identifier and the first radio bearer identifier that are configured by the processor to the benefited UE for establishing the mapping between the short range bearer and the first radio bearer according to the first short range bearer identifier and the first radio bearer identifier; and configure a second short range bearer identifier and a second radio bearer identifier, wherein the second short range bearer identifier corresponds to the short range bearer, and the second radio bearer identifier corresponds to the second radio bearer, wherein the transceiver is configured to send the second short range bearer identifier and the second radio bearer identifier that are configured by the processor to the supporting UE for establishing the mapping between the short range bearer and the second radio bearer according to the second short range bearer identifier and the second radio bearer identifier.

13. The base station according to claim 12, wherein:

the transceiver is further configured to: before sending the second reconfiguration message to the supporting UE, receive a first connection request message sent by the supporting UE;

the processor is configured to correspondingly configure the second radio bearer according to first benefited bearer information in the first connection request message received by the transceiver, wherein the first benefited bearer information comprises: an identifier of the benefited UE, the first radio bearer identifier, and the first short range bearer identifier and/or the second short range bearer identifier;

the transceiver is configured to: before sending the second reconfiguration message to the supporting UE, receive a second connection request message sent by the benefited UE; and the processor is configured to correspondingly configure the second radio bearer according to second benefited bearer information in the second connection request message received by the transceiver, wherein the second benefited bearer information comprises: an identifier of the supporting UE, the first radio bearer identifier, and the first short range bearer identifier and/or the second short range bearer identifier.

14. The base station according to claim 12, wherein:

the first short range bearer identifier is comprised in:

an Ether type field of a MAC layer or an LLC layer of the benefited UE, or a protocol layer indicated by an Ether type field of a MAC layer or an LLC layer of the benefited UE, or a protocol layer that is indicated by a field of a network layer or a transport layer indicated by an Ether type field of a MAC layer or an LLC layer of the benefited UE; and the second short range bearer identifier is comprised in:

an Ether type field of a MAC layer or an LLC layer of the supporting UE, or a protocol layer indicated by an Ether type field of a MAC layer or an LLC layer of the supporting UE, or a protocol layer that is indicated by a field of a network layer or a transport layer indicated by an Ether type field of a MAC layer or an LLC layer of the supporting UE.

15. The base station according to claim 10, wherein the transceiver is configured to send the first reconfiguration message to the benefited UE for establishing a mapping between the short range bearer and a first radio sub-bearer according to the first reconfiguration message, wherein the first radio sub-bearer is a bearer in a one-to-one correspondence to the second radio bearer in the first radio bearer.

16. A base station, comprising:

a transceiver, configured to:

send a first reconfiguration message to a benefited UE for establishing a mapping between a short range bearer and a first radio bearer according to the first reconfiguration message;

perform data receiving and sending by using the mapping between the first radio bearer and the short range bearer, wherein the first radio bearer is a benefited radio bearer of the benefited UE, the short range bearer is a bearer set up to assist a supporting UE in communication with the benefited UE, a mapping is performed between the short range bearer and a second radio bearer on a supporting UE side, the second radio bearer is a radio bearer set up for the supporting UE to assist the first radio bearer, and a mapping is performed between the first radio bearer and the second radio bearer on a base station side; and perform data sending or receiving by using the mapping between the first radio bearer and the second radio bearer.

* * * * *